United States Patent [19]
Sandhu et al.

[11] Patent Number: 5,730,642
[45] Date of Patent: *Mar. 24, 1998

[54] SYSTEM FOR REAL-TIME CONTROL OF SEMICONDUCTOR WAFER POLISHING INCLUDING OPTICAL MONTORING

[75] Inventors: Gurtej S. Sandhu; Trung Tri Doan, both of Boise, Id.

[73] Assignee: Micron Technology, Inc., Boise, Id.

[*] Notice: The portion of the term of this patent subsequent to Apr. 30, 2010, has been disclaimed.

[21] Appl. No.: 791,312

[22] Filed: Jan. 30, 1997

Related U.S. Application Data

[63] Continuation of Ser. No. 547,944, Oct. 24, 1995, Pat. No. 5,658,183, which is a continuation-in-part of Ser. No. 112,759, Aug. 25, 1993, Pat. No. 5,486,129.

[51] Int. Cl.$^6$ .................................................. B24B 49/00
[52] U.S. Cl. .............................. 451/6; 451/2; 451/41; 451/285; 451/286; 451/287; 451/288; 451/289
[58] Field of Search .................... 451/2, 6, 41, 285–289

[56] References Cited

U.S. PATENT DOCUMENTS

| | | | |
|---|---|---|---|
| 3,156,073 | 11/1964 | Strasbaugh . | |
| 3,564,776 | 2/1971 | Aspden . | |
| 3,603,042 | 9/1971 | Boettcher | 51/131 |
| 3,691,694 | 9/1972 | Goetz et al. | 451/269 |
| 3,693,301 | 9/1972 | Lemaitre | 51/235 |
| 3,841,031 | 10/1974 | Walsh | 51/283 |
| 4,050,954 | 9/1977 | Basi | 134/2 |
| 4,083,272 | 4/1978 | Miller | 82/12 |
| 4,193,226 | 3/1980 | Gill, Jr. et al. | 51/124 |
| 4,365,301 | 12/1982 | Arnold et al. | 364/475 |
| 4,450,652 | 5/1984 | Walsh | 51/131.4 |
| 4,513,538 | 4/1985 | Wolters et al. | 451/287 |
| 4,793,895 | 12/1988 | Kaanta et al. | 156/627 |
| 4,811,522 | 3/1989 | Gill, Jr. | 51/131 |
| 4,850,150 | 7/1989 | Heynacher et al. | 51/165.71 |
| 4,912,883 | 4/1990 | Chang et al. | 51/165 |
| 4,930,262 | 6/1990 | Sennewald | 51/165.74 |
| 4,940,507 | 7/1990 | Harbarger | 156/636 |
| 5,036,015 | 7/1991 | Sandhu et al. | 437/8 |
| 5,069,002 | 12/1991 | Sandhu et al. | 51/165 |
| 5,081,421 | 1/1992 | Miller et al. | 324/671 |
| 5,081,796 | 1/1992 | Schultz | 51/165.74 |

(List continued on next page.)

FOREIGN PATENT DOCUMENTS

| | | |
|---|---|---|
| 61-164773 (A) | 7/1986 | Japan . |
| 61-188071 | 8/1986 | Japan . |
| 61-244460 | 10/1986 | Japan . |
| 61-265262 | 11/1986 | Japan . |
| 63-256342 (A) | 10/1988 | Japan . |
| 3-142929 | 6/1991 | Japan . |
| 4-217456 | 8/1992 | Japan . |
| 5-69311 | 3/1993 | Japan . |
| 6-39704 | 2/1994 | Japan . |
| 91-197067/27 | 10/1989 | WIPO .............. B24B 37/04 |

OTHER PUBLICATIONS

Specification of *The Nova Scan 210: Integrated Thickness Monitoring System*.

Primary Examiner—Robert A. Rose
Assistant Examiner—George Nguyen
Attorney, Agent, or Firm—Wells, St. John, Roberts, Gregory & Matkin, P.S.

[57] ABSTRACT

A system for polishing a semiconductor wafer, the system comprising a wafer polishing assembly for polishing a face of a semiconductor wafer at a polishing rate and a polishing uniformity, the wafer polishing assembly including a platen subassembly defining a polishing area, a slurry supply system delivering a slurry to the polishing area, and a polishing head selectively supporting a semiconductor wafer and holding a face of the semiconductor wafer in contact with the platen subassembly; and an optical measurement system measuring film thickness at multiple different locations on the wafer face while the wafer is under a liquid, wherein drying of the wafer is avoided while the measurements are taken.

24 Claims, 17 Drawing Sheets

U.S. PATENT DOCUMENTS

| | | | |
|---|---|---|---|
| 5,085,015 | 2/1992 | Adcock | 51/319 |
| 5,099,614 | 3/1992 | Arai et al. | 51/165 |
| 5,104,828 | 4/1992 | Morimoto et al. | 437/225 |
| 5,113,622 | 5/1992 | Nishiguchi et al. | 451/7 |
| 5,127,196 | 7/1992 | Morimoto et al. | 51/165.73 |
| 5,157,876 | 10/1992 | Medellin | 51/281 |
| 5,196,353 | 3/1993 | Sandhu et al. | 437/8 |
| 5,205,077 | 4/1993 | Wittstock | 51/165 |
| 5,232,875 | 8/1993 | Tuttle et al. | 451/63 |
| 5,240,552 | 8/1993 | Yu et al. | 156/636 |
| 5,245,794 | 9/1993 | Salugsugan | 51/165.74 |
| 5,308,438 | 5/1994 | Cote et al. | 156/636 |
| 5,413,941 | 5/1995 | Koos et al. | 437/8 |
| 5,433,650 | 7/1995 | Winebarger | 451/6 |
| 5,433,651 | 7/1995 | Lustig et al. | 451/6 |
| 5,486,129 | 1/1996 | Sandhu et al. | 451/6 |
| 5,549,511 | 8/1996 | Cronin et al. | 451/281 |
| 5,597,442 | 1/1997 | Chen et al. | 156/626.1 |
| 5,643,060 | 7/1997 | Sandhu et al. | 451/285 |
| 5,658,183 | 8/1997 | Sandhu et al. | 451/6 |

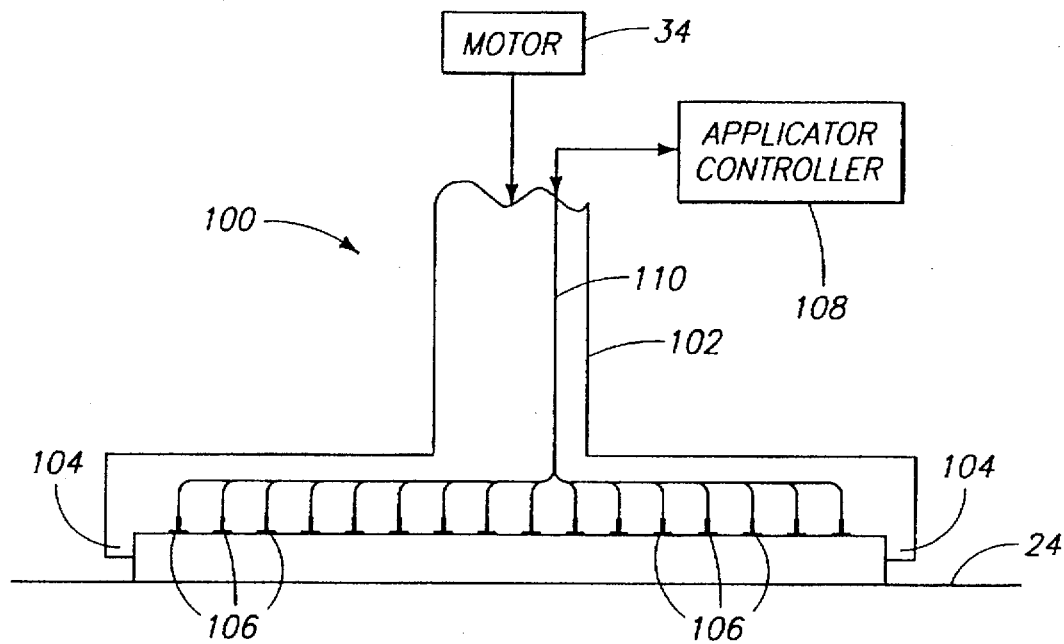
_FIG. 3_
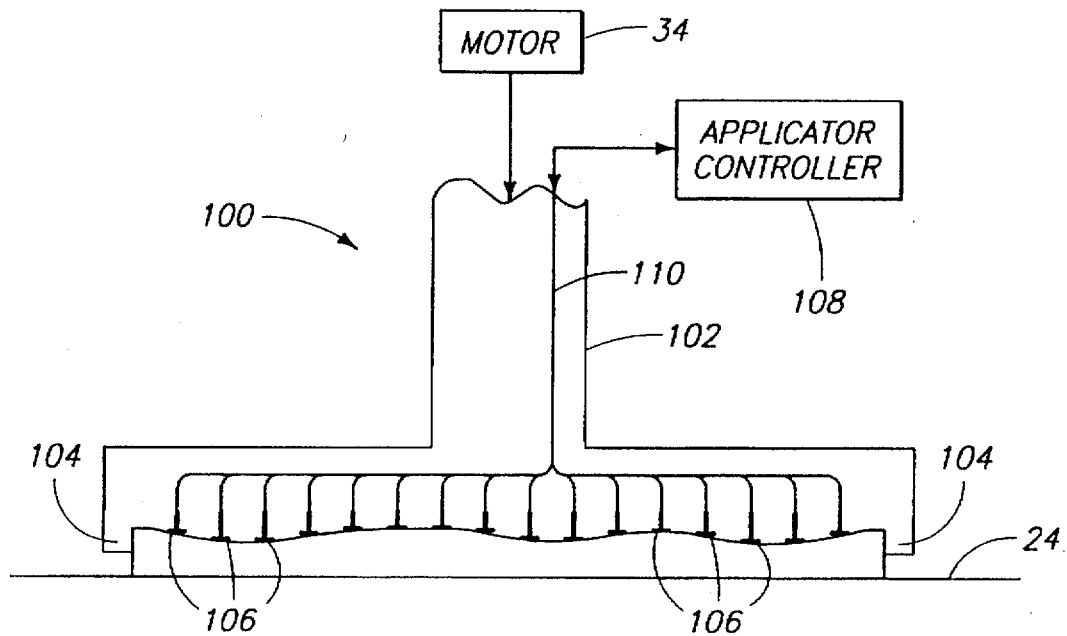
_FIG. 4_

5,730,642

SYSTEM FOR REAL-TIME CONTROL OF SEMICONDUCTOR WAFER POLISHING INCLUDING OPTICAL MONITORING

CROSS REFERENCE TO RELATED APPLICATION

This is a continuation of co-pending application Ser. No. 08/547,944, filed Oct. 24, 1995, U.S. Pat. No. 5,658,183, and titled "System for Real-Time Control of Semiconductor Wafer Polishing Including Optical Monitoring" listing inventors as Gurtej S. Sandhu and Trung Tri Doan, which in turn is a continuation-in-part of U.S. patent application Ser. No. 08/112,759 filed Aug. 25, 1993, now U.S. Pat. No. 5,486,129.

TECHNICAL FIELD

This invention relates to systems for polishing semiconductor wafers.

BACKGROUND OF THE INVENTION

In the fabrication of integrated circuits, numerous integrated circuits are typically constructed simultaneously on a single semiconductor wafer. The wafer is then later subjected to a singulation process in which individual integrated circuits are singulated from the wafer. At certain stages of fabrication, it is often necessary to polish a surface of the semiconductor wafer. In general, a semiconductor wafer can be polished to remove high topography, surface defects such as crystal lattice damage, scratches, roughness, or embedded particles of dirt or dust. This polishing process is often referred to as mechanical planarization (MP) and is utilized to improve the quality and reliability of semiconductor devices. This process is usually performed during the formation of various devices and integrated circuits on the wafer.

The polishing process may also involve the introduction of a chemical slurry to facilitate higher removal rates and selectivity between films of the semiconductor surface. This polishing process is often referred to as chemical mechanical planarization (CMP).

In general, the polishing process involves holding and rotating a thin flat wafer of semiconductor material against a polishing surface under controlled pressure and temperature. One such apparatus for polishing thin flat semiconductor wafers is discussed in our U.S. Pat. No. 5,081,796. Other apparatuses are described in U.S. Pat. Nos. 4,193,226 and 4,811,522 to Gill, Jr. and U.S. Pat. No. 3,841,031 to Walsh.

One problem encountered in polishing processes is the non-uniform removal of the semiconductor surface. Removal rate is directly proportional to downward pressure on the wafer, rotational speeds of the platen and wafer, slurry particle density and size, slurry composition, and the effective area of contact between the polishing pad and the wafer surface. Removal caused by the polishing platen is related to the radial position on the platen. The removal rate is increased as the semiconductor wafer is moved radially outward relative to the polishing platen due to higher platen rotational velocity. Additionally, removal rates tend to be higher at wafer edge than at wafer center because the wafer edge is rotating at a higher speed than the wafer center.

Another problem in conventional polishing processes is the difficulty in removing non-uniform films or layers which have been applied to the semiconductor wafer. During the fabrication of integrated circuits, a particular layer or fill may have been deposited or grown in a desired uneven manner resulting in a non-uniform surface which is subsequently subjected to polishing processes. The thicknesses of such layers or films can be very small (on the order of 0.5 to 5.0 microns), thereby allowing little tolerance for non-uniform removal. A similar problem arises when attempting to polish warped surfaces on the semiconductor wafer. Warpage can occur as wafers are subjected to various thermal cycles during the fabrication of integrated circuits. As a result of this warpage, the semiconductor surface has high and low areas, whereby the high areas will be polished to a greater extent than the low areas.

As a result of these polishing problems, individual regions of the same semiconductor wafer can experience different polishing rates. As an example, one region may be polished at a much higher rate than that of other regions, causing removal of too much material in the high rate region or removal of too little material in the lower rate regions.

A compounding problem associated with polishing semiconductor wafers is the inability to monitor polishing conditions in a effort to detect and correct the above inherent polishing problems as they occur. It is common to conduct numerous pre-polishing measurements of the wafer before commencement of the polishing process, and then conduct numerous similar post-polishing measurements to determine whether the polishing process yielded the desired topography, thickness, and uniformity. However, these pre- and post-polishing measurements are labor intensive and result in a low product throughput.

It is also important to be able to determine when an end point has been reached, such that polishing can stop. Optical scanning of a wafer and a pattern recognition system could be employed. Using prior art pattern recognition techniques, the wafer would be moved so that multiple points of the wafer could be scanned. A problem with moving the wafer is that slurry on the wafer would dry while the wafer is being scanned, and if the wafer is out of specification, it would be difficult to further polish the wafer after the slurry has dried on the wafer.

The present invention provides a polishing system and method which significantly reduces the problems associated with non-uniform removal and monitoring of the polishing process, and provides various end-pointing techniques for determining whether polishing of a wafer is complete.

SUMMARY OF THE INVENTION

The invention provides a system for polishing a semiconductor wafer. In accordance with one aspect of the invention, the system comprises an optical measurement system including a liquid filled, wafer receiving area which selectively receives the wafer.

In accordance with one aspect of this invention, a system for polishing a semiconductor wafer comprises a wafer polishing assembly for polishing a face of a semiconductor wafer at a polishing rate and a polishing uniformity. The wafer polishing assembly has a plurality of controllable operational parameters that upon variation change the polishing rate and polishing uniformity. The system also comprises a controller operably coupled to the wafer polishing assembly for monitoring and managing in situ at least one of the operational parameters of the wafer polishing assembly. A processor is operably coupled to the controller for determining a set of desired operational parameters based on the monitored operational parameters and for outputting control information indicative of the desired operational parameters to the controller. The controller adjusts in situ at least one of the operational parameters of the wafer polishing assembly in response to the control information from the processor to effectuate a new polishing rate and a new polishing uniformity as the wafer polishing assembly continues to polish the face of the semiconductor wafer.

These operational parameters include platen rotational velocity, wafer rotational velocity, the polishing path of the wafer, the wafer speed across the platen, the down force exerted on the wafer, slurry composition, slurry flow rate, and temperature at the wafer surface.

According to another aspect of this invention, a system for polishing a semiconductor wafer comprises a rotatable platen subassembly which defines a polishing area and a drive mechanism coupled to rotate the platen subassembly at a platen velocity. The system further comprises a polishing head for supporting a semiconductor wafer and holding a face of the semiconductor wafer in contact with the platen subassembly to polish the wafer face whereby individual regions of the wafer face have different polishing rates. The polishing head has pressure applicators for applying various localized pressures on individual regions of the semiconductor wafer to cause the semiconductor wafer to conform the wafer face to a selected contour. The system also comprises a polish control subsystem for monitoring in situ the polishing rates at various regions of the semiconductor wafer and adjusting in situ at least one of the platen velocity and the individual localized pressures applied to the semiconductor wafer to change the polishing rates of the individual regions of the semiconductor wafer.

In another aspect of the invention, a system for polishing a semiconductor wafer comprises a wafer polishing assembly for polishing a face of a semiconductor wafer at a polishing rate and a polishing uniformity, the wafer polishing assembly including a platen subassembly defining a polishing area, a slurry supply system delivering a slurry to the polishing area, and a polishing head selectively supporting a semiconductor wafer and holding a face of the semiconductor wafer in contact with the platen subassembly; and an optical measurement system including a liquid filled, wafer receiving area which selectively receives the wafer, the optical measurement system measuring film thickness at multiple different locations on the wafer face while the wafer is under a liquid, wherein drying of the wafer is impeded while the film thickness measurements are taken.

In another aspect of the invention, a system for polishing a semiconductor wafer comprises a wafer polishing assembly for polishing a face of a semiconductor wafer at a polishing rate and a polishing uniformity, the wafer polishing assembly including a platen, a polishing head which supports the semiconductor wafer, and a polishing head displacement mechanism which moves the polishing head and wafer across the platen, the wafer polishing assembly having a plurality of controllable operational parameters that upon variation change the polishing rate and polishing uniformity; a controller operably coupled to the wafer polishing assembly for monitoring and managing in situ at least one of the operational parameters of the wafer polishing assembly; a processor operably coupled to the controller for determining a set of desired operational parameters based on the monitored operational parameters and outputting control information indicative of the desired operational parameters to the controller, the controller adjusting in situ at least one of the operational parameters of the wafer polishing assembly in response to the control information from the processor to effectuate a new polishing rate and a new polishing uniformity as the wafer polishing assembly continues to polish the face of the semiconductor wafer; and an optical measurement system selectively measuring film thickness at multiple different locations on the wafer face, the optical measurement system including a liquid filled wafer receiving area keeping the wafer face wet while the film thickness measurements are taken.

In another aspect of the invention, a system for polishing a semiconductor wafer comprises a wafer polishing assembly for polishing a face of a semiconductor wafer at a polishing rate and a polishing uniformity, the wafer polishing assembly including a platen, a polishing head which supports the semiconductor wafer, and a polishing head displacement mechanism which moves the polishing head and wafer across the platen, the wafer polishing assembly having a plurality of controllable operational parameters that upon variation change the polishing rate and polishing uniformity; a controller operably coupled to the wafer polishing assembly for monitoring and managing in situ at least one of the operational parameters of the wafer polishing assembly; a processor operably coupled to the controller for determining a set of desired operational parameters based on the monitored operational parameters and outputting control information indicative of the desired operational parameters to the controller, the controller adjusting in situ at least one of the operational parameters of the wafer polishing assembly in response to the control information from the processor to effectuate a new polishing rate and a new polishing uniformity as the wafer polishing assembly continues to polish the face of the semiconductor wafer; and a detector operating on the wafer and communicating with the processor to determine whether polishing of the wafer is complete, the detector including an optical measurement system measuring film thickness at multiple different locations on the wafer face while the wafer is under a liquid.

BRIEF DESCRIPTION OF THE DRAWINGS

One or more preferred forms of the invention are described herein with reference to the accompanying drawings. Like components and features are referenced by like numerals throughout the drawings. The drawings are briefly described below.

FIG. 3 is a diagrammatic side view of a polishing head according to another aspect of this invention. The polishing head has multiple pressure applicators, and FIG. 3 shows the pressure applicators in their retracted positions.

FIG. 4 is a diagrammatic side view similar to FIG. 3 and illustrates some of the pressure applicators in extended positions.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
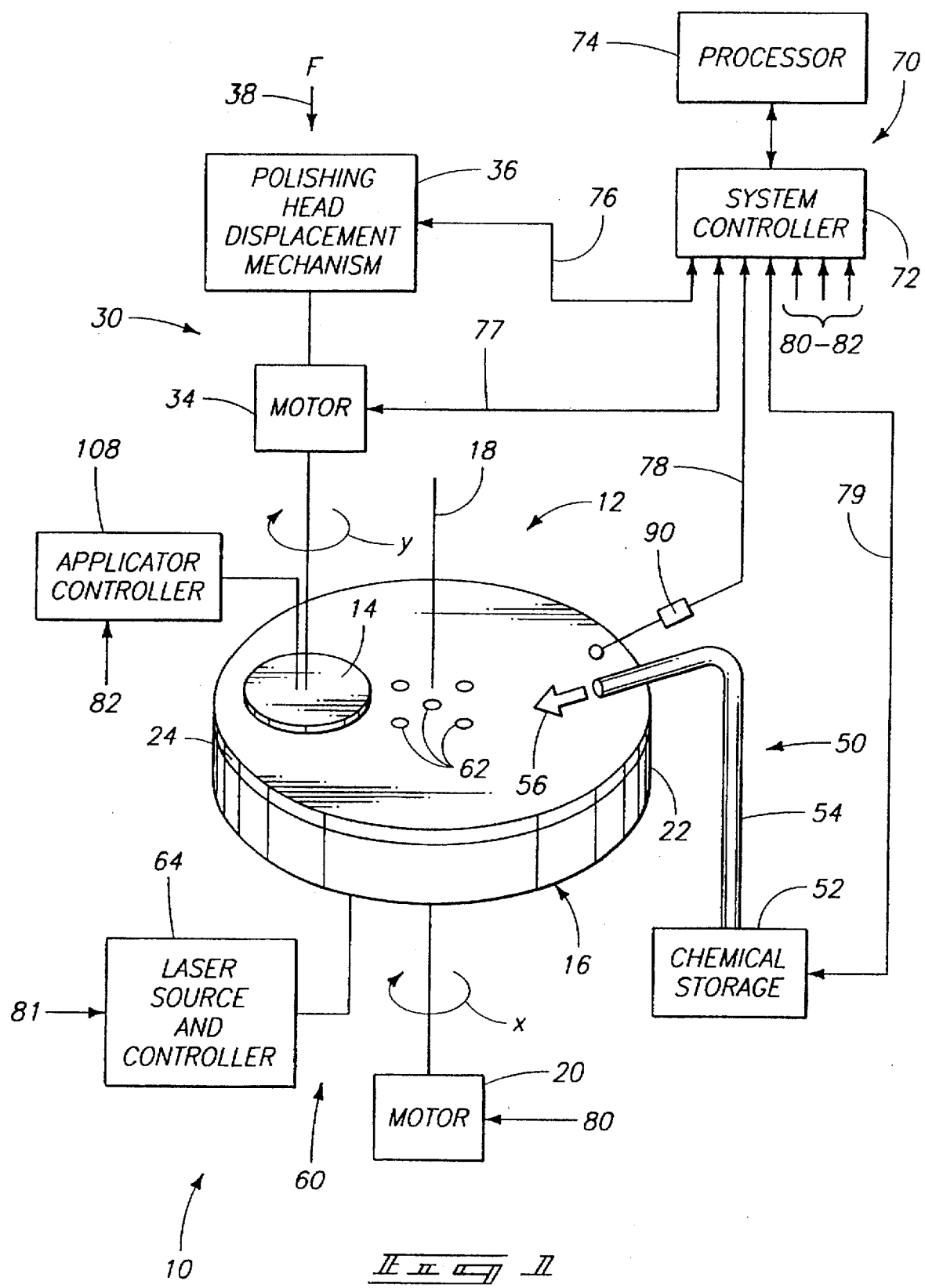
FIG. 1 is a diagrammatic perspective view of a polishing system according to the invention.
Figure 2:
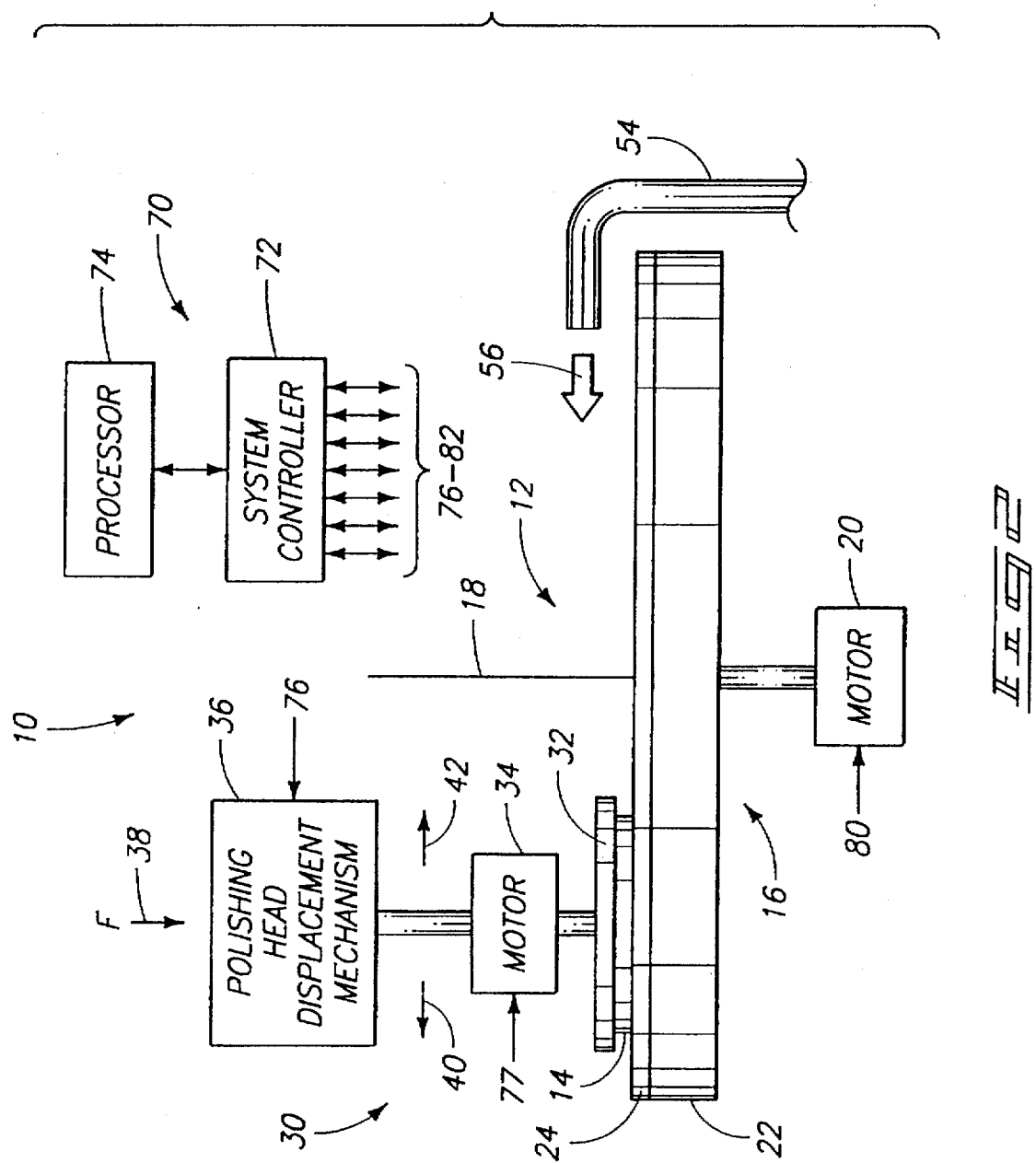
FIG. 2 is a diagrammatic side view of the polishing system.

FIGS. 1-2 are diagrammatical illustrations of a polishing system 10 for polishing a semiconductor wafer. In its preferred form, system 10 includes a chemical or slurry supply system 50 for introducing a chemical slurry into the polishing environment to facilitate wafer polishing. Accordingly, in its preferred form, system 10 is a chemical mechanical planarization (CMP) apparatus. However, as will be more apparent in the continuing discussion, this invention is also capable of being practiced using mechanical polishing techniques without introduction of a chemical slurry.

Polishing system 10 has a wafer polishing assembly 12 for polishing a face of a semiconductor wafer 14. Wafer polishing assembly 12 includes a rotatable platen subassembly 16 that is rotated at a platen velocity $V_P$ about a center axis 18 by a motor or other drive mechanism 20. The platen subassembly can be rotated in a clockwise direction x (FIG. 1) or in the counterclockwise direction. Platen subassembly 16 includes a platen 22 and a pad 24 mounted on the platen. Both the platen 22 and pad 24 are preferably circular. Pad 24 protects platen 22 from the chemical slurry introduced during the polishing process, and is typically made of blown polyurethane. As used in this disclosure, the term "platen subassembly" is intended to include both a platen without a pad (i.e., for some mechanical planarization situations) and a platen provided with a pad (i.e., for chemical mechanical planarization situations).

Wafer polishing assembly 12 also includes polishing head subassembly 30 which consists of polishing head 32 (FIG. 2), motor or other drive mechanism 34, and polishing head displacement mechanism 36. Polishing head 32 supports semiconductor wafer 14 and holds the wafer face in contact with pad 24 of platen subassembly 16. Polishing head 32 applies a controlled adjustable downward force F (as illustrated by arrow 38) to press semiconductor wafer 14 into pad 24 to facilitate polishing of the wafer face. Motor 34 rotates polishing head 32 and wafer 14 at a wafer velocity $V_W$ in a clockwise rotational direction y which is preferably the same rotational direction of platen subassembly 16 (although wafer 14 can be rotated in the counterclockwise direction or opposite to rotation of the platen subassembly as desired).

Polishing head displacement mechanism 36 moves polishing head 32 and wafer 14 under controlled force F across platen subassembly 16 as indicated by arrows 40 and 42. The wafer is moved at an adjustable rate and along a variable polishing path. The polishing path can be linear, sinusoidal, or a variety of other patterns. Polishing head displacement mechanism 36 is also capable of moving semiconductor wafer 14 along a polishing path to a location beyond the edge of pad 24 so that wafer 14 "overhangs" the edge. This overhang arrangement permits wafer 14 to be moved partially on and partially off pad 24 to compensate for polishing irregularities caused by relative velocity differential between the faster moving outer portions and the slower moving inner portions of platen subassembly 16.

Polishing head 32 includes means for holding the semiconductor wafer 14. One example holding means is a vacuum-type mechanism which generates a negative vacuum force to draw the wafer against the polishing head. The vacuum-type mechanism is helpful in initially lifting and positioning the wafer on the polishing head. Once the wafer is positioned on the polishing head and held in contact with the platen subassembly for polishing, the vacuum force can be removed. The polishing head is designed with a friction surface, or alternatively includes a carrier pad, which engages the upper, non-exposed face of the wafer and the friction force created between the polishing head and wafer effectively holds the wafer against the polishing head and causes the wafer to rotate at the same velocity as the polishing head. Such polishing heads and carrier pads are of conventional design and are commercially available.

FIGS. 3-6 illustrate another polishing head 100 unique to this invention which can be used in the polishing system 10. Polishing head 100 has a wafer carrier 102 sized to accommodate semiconductor wafer 14. Wafer carrier 102 has a relatively flat surface and a surrounding, annular flange 104 which defines a holding area. An upper, backside, or non-exposed face of semiconductor wafer 14 lies in juxtaposition with the flat surface of the wafer carrier 102. A lower, frontside, or exposed face of wafer 14 is held in contact with pad 24 during polishing. Flange 104 is sized to extend partially along and around wafer 14 to assist in maintaining the wafer within the holding area.

Polishing head 100 also has one or more pressure applicators 106 provided on the wafer carrier 102. The pressure applicators 106 are individually controllable to move over a range of positions from retracted positions (FIG. 3) to extended positions (FIG. 4, for some of the applicators). Under a preferred embodiment, a carrier pad is located over the wafer carrier 102 between the pressure applicators 106 and the wafer. The carrier pad induces an effective friction at the wafer backside to cause the wafer to rotate with the wafer carrier and not slip. The carrier pad is not shown for purposes of clarity in describing the contour changing effect on the wafer caused by the individually controllable pressure applicators.

The applicators 106 operatively engage the non-exposed face of the semiconductor wafer (preferably, through the carrier pad) and, as moved toward their extended positions, apply multiple isolated localized pressures on individual regions of the wafer. The localized pressures cause the semiconductor wafer to bend or bow and alter the contour of the exposed face being held against pad 24.

Figure 5:
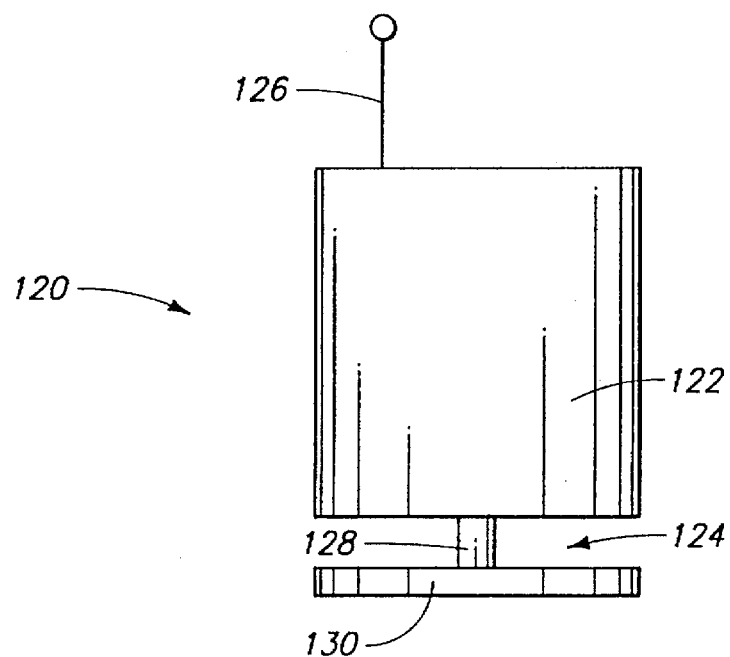
FIG. 5 is an enlarged diagrammatic side view of a pressure applicator for use in the FIG. 3 polishing head according to one embodiment of this invention.
Figure 6:
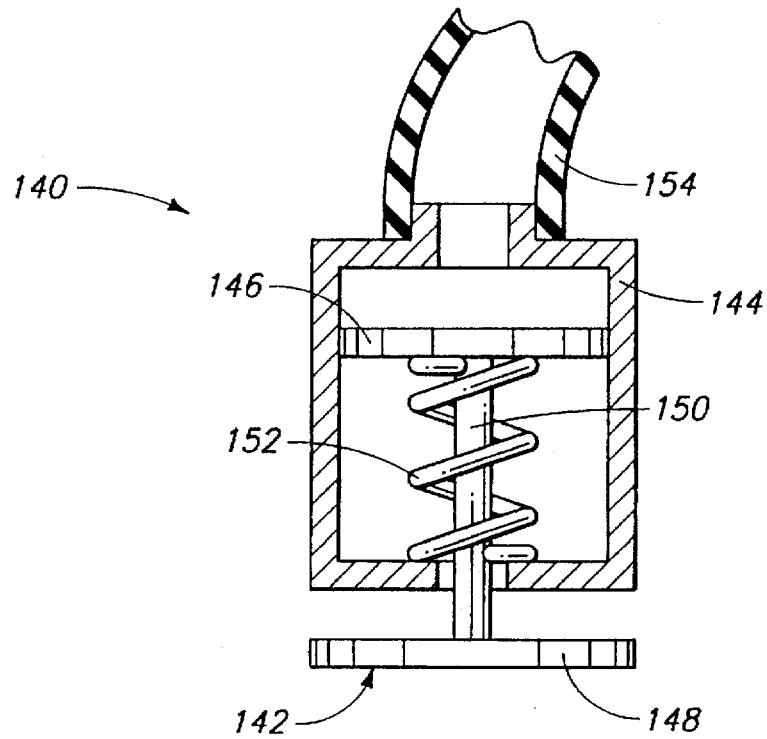
FIG. 6 is an enlarged diagrammatic side view of a pressure applicator for use in the FIG. 3 polishing head according to another embodiment of this invention.

Individual pressure applicators 106 preferably include a slidable piston which controllably moves between a retracted and extended position. FIGS. 5 and 6 show two embodiments of a piston-based pressure applicator. In FIG. 5, pressure applicator 120 comprises a solenoid or servomechanism 122 which operatively drives a piston 124 to a desired position in response to electrical signals received on input line(s) 126. Piston 124 includes a shaft 128 and a flat, circular disk 130 mounted to the shaft.

In FIG. 6, pressure applicator 140 comprises an "T"-shaped piston 142 slidably mounted with a hollow, cylindrical housing 144. Piston 142 has an upper disk 146 sized to fit closely within the interior surface of housing 144, a lower disk 148 positioned outside of housing 144, and a shaft 150 interconnecting the two disks. A spring 152 is disposed about shaft 150 between a bottom wall or floor of housing 144 and the upper disk 146 to bias the piston 142 to its retracted position. Housing 144 has an upper opening which is operatively coupled to a tube or conduit 154 to provide fluid communication between the conduit 154 and the housing chamber. A fluid (which can be gas or liquid) is transferred under controlled pressure through conduit 154 against upper piston disk 146, whereby the pressure is effective to overcome the bias of spring 152 to cause the desired movement of piston 142.

As shown in FIGS. 3 and 4, applicators 106 are individually coupled to an applicator controller 108 via a suitable connecting means 110. When the servomechanism pressure applicators 120 of FIG. 5 are used, applicator controller 108 consists of a servo-electric applicator controller which generates electric signals that operatively position the servomechanism pressure applicators 120. The connecting means 110 consists of a bus or conductors suitable to carry the electric signals from the servo-electric applicator controller to individual applicators and to provide feedback. On the other hand, when pressure applicators 140 of FIG. 6 are employed, applicator controller 108 consists of a fluid force generator which outputs a fluid under a controlled pressure. The connecting means 110 consists of tubing or conduits to transfer fluid under pressure from the fluid force generator to individual applicators.

According to the polishing head of this invention, the polishing rates of individual regions across the wafer face can be independently controlled to effectuate the desired polishing results. Prior to this invention, the semiconductor experienced different polishing rates in various regions across the wafer face caused by the polishing environment including such things as platen velocity, wafer velocity, slurry composition, type of material on the wafer face, the down force applied to the wafer, and wafer movement across the platen. This invention is advantageous because it provides superior control in selectively isolating and changing the polishing rates of specific regions of the semiconductor wafer in a real-time manner during polishing while globally polishing the entire wafer.

With reference again to FIGS. 1 and 2, wafer polishing assembly 12 also includes chemical supply system 50 for introducing a chemical slurry of a desired composition. Chemical supply system 50 has a chemical storage 52 for storing slurry and a conduit 54 for transferring the slurry from chemical storage 52 to the polishing area atop platen subassembly 16. Chemical supply system 50 introduces slurry as indicated by arrow 56 atop pad 24 at a selected flow rate. This chemical slurry provides an abrasive material which facilitates polishing of the wafer face, and is preferably a composition formed of a solution including solid alumina or silica. However, according to this invention, the composition can be controllably altered to add or remove individual chemicals from the slurry, or to change the ratios within the composition.

Wafer polishing assembly 12 has a film thickness measurement device 60 for measuring topography of the wafer face during polishing. Film thickness measurement device 60 is preferably implemented in the form of a laser interferometer measuring apparatus which employs interference of light waves for purposes of measurement. The laser interferometer measuring apparatus includes light transmitter/receiver units 62 provided at the surface of the platen subassembly 16 which transmit light at the wafer face and collect reflections therefrom. The laser apparatus also includes laser source and controller 64 which is optically coupled to units 62. The laser apparatus is configured to measure thicknesses and contour of films and materials on the wafer face. Apart from the laser apparatus, this invention also contemplates other techniques and systems that can be used as a film thickness measurement device including a system for measuring capacitance change during wafer polishing, a device for detecting friction change at the wafer surface, and an acoustic mechanism for measuring wave propagation as films and layers are removed during polishing.

Wafer polishing assembly 12 also includes a temperature sensor 90 positioned to detect temperature within the polishing area atop the pad 24.

Polishing system 10 further includes a polish control subsystem 70 for monitoring in situ the operating parameters of the polishing system and adjusting in situ one or more polishing parameters to effectuate the desired polishing results for a particular semiconductor wafer. The operating parameters are such that variation of one or more of the parameters effectively changes the polishing rates and polishing uniformity across the wafer face.

Polish control subsystem 70 includes a system controller 72 and a processor 74. System controller 72 is operatively coupled to the components of the system via connectors 76–82 (and various other connectors shown in FIGS. 7–16) to monitor and manage in real-time at least one of the operational parameters. The parameters are input to processor 74 which determines the present state polishing status of the semiconductor wafer, including polishing uniformity and various polishing rates across the wafer. Processor 74 then determines a set of desired operational parameters which effectuates the desired polishing uniformity and rates, and outputs control information indicative of these desired parameters. Processor 74 can be embodied as a microprocessor, an ASIC, or some other processing means for determining the desired operational parameters. Processor 74 may include computational means for calculating specific parameters, memory look-up tables for generating values given the measured parameters, or neural networks and fuzzy logic techniques for systematically arriving at optimal parameters.

The controller 72 uses the control information to adjust the system components and thereby modify the operational parameters which will tend to subject the wafer to polishing conditions that more closely approximate the desired polishing uniformity and rates. More specifically, controller 72 is coupled to polishing head displacement mechanism 36 via connector 76 to monitor and controllably adjust in situ the polishing path of the semiconductor wafer and the speed at which the wafer is moved across the platen subassembly 16. Controller 72 is coupled to motor 34 via connector 77 to monitor the motor rpm and wafer velocity imparted by the polishing head. Controller 72 commands the motor to speed up or slow down based on the information received from processor 74. Controller 72 is coupled to motor 20 via connector 80 to monitor the motor rpm and platen velocity of platen subassembly 16, and to adjust the speed of the platen subassembly as desired.

Controller 72 is connected to slurry supply means 50 via connector 79 to monitor and adjust slurry composition and flow rate. Controller 72 is coupled to temperature sensor 90 via connector 78 to receive feedback information concerning temperature of the polishing environment and wafer surface. Connector 81 conveys control signals and feedback information between controller 72 and film thickness measurement device 60.

When system 10 is adapted to incorporate polishing head 100 of FIGS. 3 and 4, applicator controller 108 is operatively coupled via connector 82 to system controller 72. According to this embodiment, controller 72 can make independent adjustments to one or more of the pressure applicators 106 on head 100, causing manipulation of the wafer face contour. This control permits regional or localized polishing with a semiconductor wafer.

Controller 72 works in conjunction with film thickness measurement device 60 to determine the polishing rates and uniformity across the wafer during real-time evaluations. This information is passed to processor 74 which then generates a map indicative of the polish rates and/or uniformity across the semiconductor wafer face for use in adjusting system operational parameters. Preferably, this map is generated on a periodic basis. In one embodiment, such mapping is performed using the techniques disclosed in U.S. Pat. No. 5,196,353, issued to Sandhu et al., assigned to the assignee of the present invention, and incorporated herein by reference. The technique disclosed in U.S. Pat. No. 5,196,353 involves using an infrared camera to detect infrared waves emitted from a wafer and correlating this information to the heat of various points on the wafer. Using this arrangement, the relative temperature at any point on the wafer is detected and mapped, and an infrared image of the surface of the wafer is developed.

Figure 7:
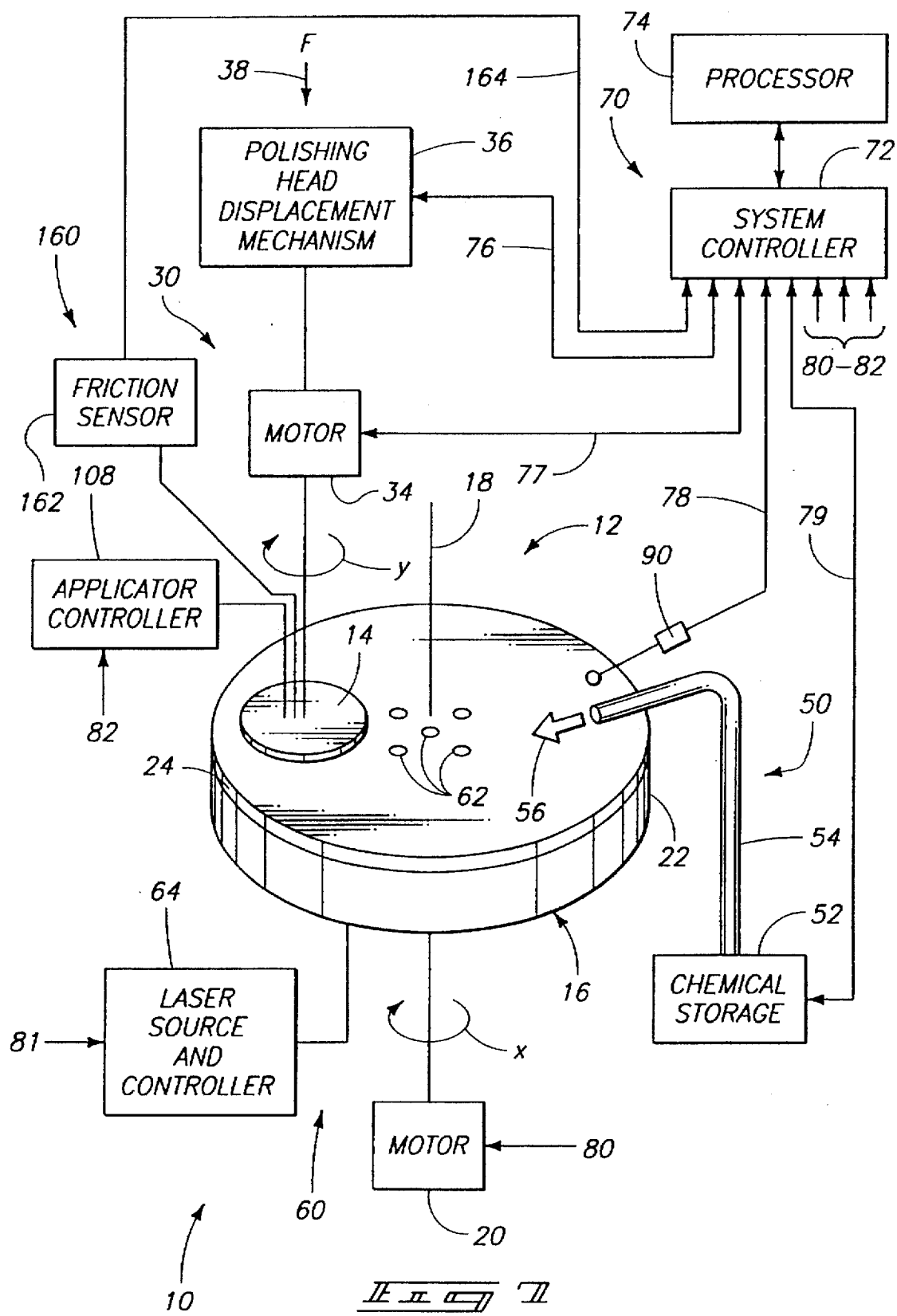
FIG. 7 is a diagrammatic perspective view of a polishing system including an end point detector, according to another embodiment of this invention.

In one embodiment, shown in FIG. 7, the system 10 further comprises an end point detector (or end point detection means) 160 operating on the wafer and communicating with the system controller 72, and thus with the processor 74, for determining if polishing of the wafer is complete. In the embodiment shown in FIG. 7, the end point detector comprises means for sensing a change in friction between the wafer and the polishing platen. Such friction sensing is disclosed in detail in U.S. Pat. Nos. 5,036,015, and 5,069,002 issued to Sandhu et al., assigned to the assignee of the present invention, and incorporated herein by reference.

More particularly, in the embodiment shown in FIG. 7, the end point detector 160 comprises a friction sensor 162 sensing friction between the wafer and the polishing platen. The friction sensor 162 is in communication with the controller 72 (and thereby with the processor 74) via conductor 164.

As the semiconductor wafer is rotated and pressed against the platen subassembly 16, the oxide surface of the wafer contacts the polishing pad 24 of the platen 22. The oxide surface of the wafer has a hardness that produces a coefficient of friction when contacting the pad 24, which depends in part on the amount and composition of the slurry delivered by the slurry supply system 50. The coefficient of friction remains substantially constant until the oxide is polished away to a point where IC devices on the wafer are exposed. The IC devices may be of a harder material than the oxide surface of the wafer. A different coefficient of friction is thus present when the oxide is polished away. Similarly, the coefficient of friction is different for different films formed on the wafer. Such different coefficients of friction will be detected using the friction sensor 162. More particularly, the change in friction is detected by the processor 74 which monitors friction over time for given parameters (such as speed of the motor 34, speed of the motor 20, downforce F, etc.). By sensing the change in friction that is not caused by a change in a controllable operating parameter, the processor 74 determines when an end point has been reached, and polishing can stop. The desired end point is preprogrammed into the processor, and can be after the oxide surface is removed, or after a certain film formed on the substrate is removed.

Figure 8:
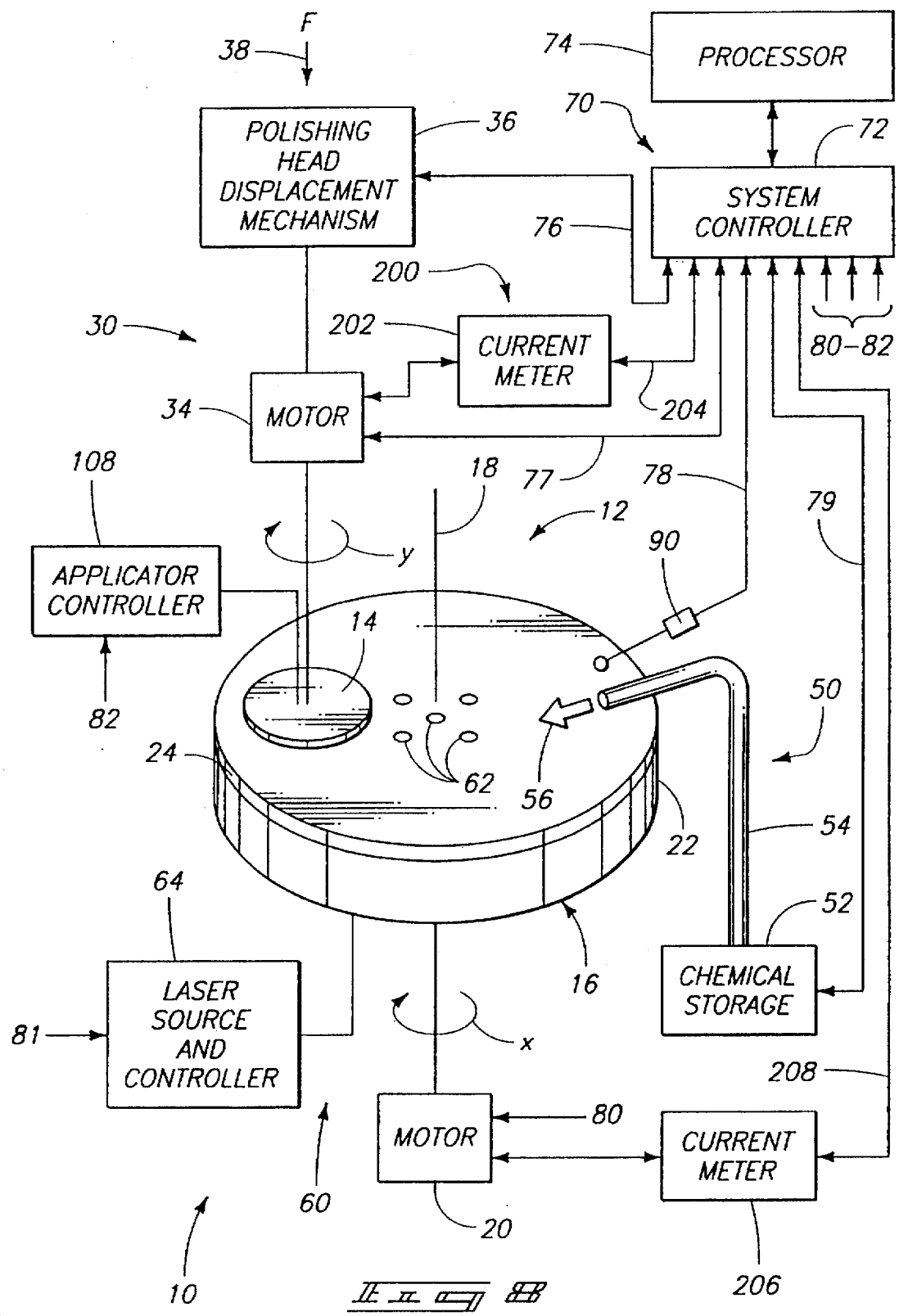
FIG. 8 is a diagrammatic side view of a polishing system including an alternative end point detector.

In an alternative embodiment, shown in FIG. 8, the system includes an end point detector 200 comprising a current meter 202 electrically connected to the motor 34 and in communication with the controller 72 (and thereby with processor 74) via conductor 204, or a current meter 206 electrically connected to the motor 20 and in communication with the controller 72, or both current meters 202 and 206. The current meter 202 and/or 204 indicates to the processor 74 a change in friction by detecting a change in amperage through the motor 34 and/or 20.

Figure 9:
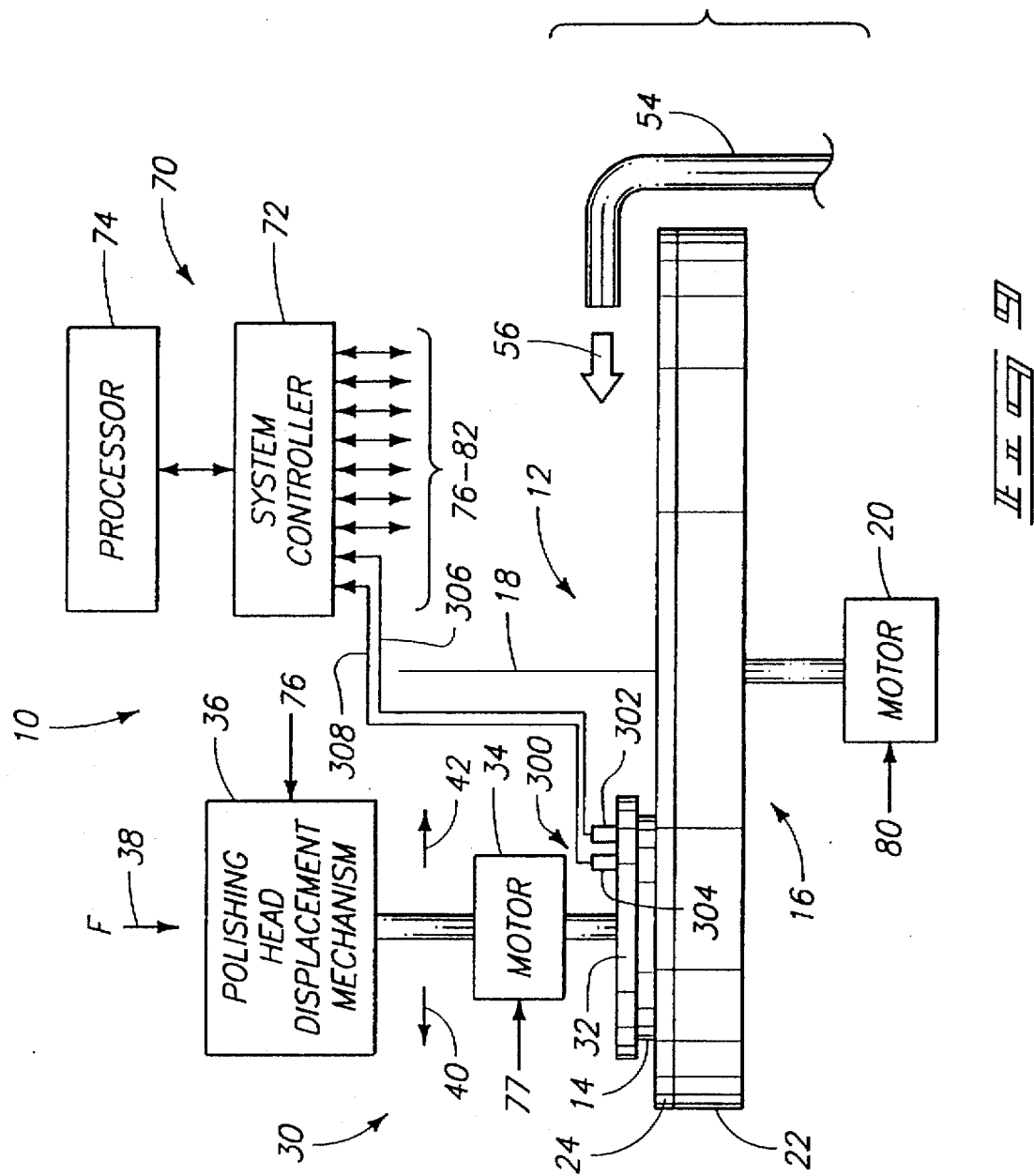
FIG. 9 is a diagrammatic side view of a polishing system including an alternative end point detector.
Figure 10:
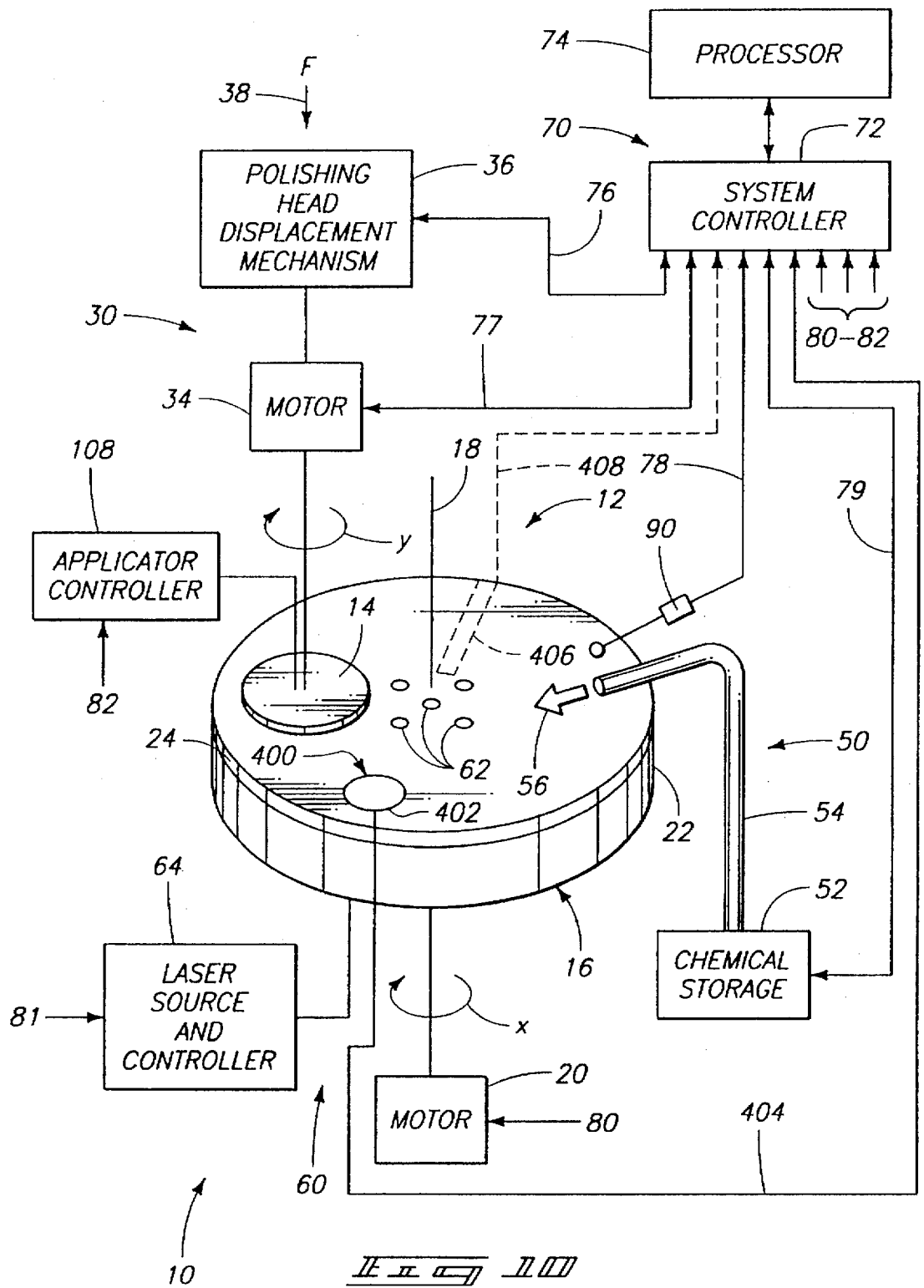
FIG. 10 is a diagrammatic perspective view of a polishing system including another alternative end point detector.

In an alternative embodiment shown in FIG. 9, the system includes an end point detector (or end point detection means) 300 which comprises means for directing acoustic waves at the wafer, and means for receiving reflected acoustic waves from the wafer. The use of acoustic waves in an end point detector is disclosed in U.S. Pat. No. 5,240,552, issued to Yu et al., assigned to the assignee of the present invention, and incorporated herein by reference.

More particularly, in the illustrated embodiment, the means for directing acoustic waves at the wafer comprises an acoustic wave transducer 302 connected to the controller 72 (and thus to the processor 74) via line 306, and the means for receiving reflected acoustic waves comprises an acoustic wave receiver 304 mounted to receive acoustic waves reflected from the wafer and connected to the controller 72 (and thus to the processor 74) via line 308. The transducer 302 converts an applied electrical voltage into a mechanical strain producing an acoustical wave. In one embodiment, the transducer 302 comprises a piezoelectric transducer, such as a thin film transducer, that converts a voltage into an acoustical wave. Similarly, in one embodiment, the receiver 304 comprises a piezoelectric receiver, such as a thin fill receiver, that converts a reflected acoustic wave into a voltage. In the illustrated embodiment, the acoustic waves are directed at the backside of the wafer. In an alternative embodiment (not shown), the waves are directed at the front of the wafer by causing the polishing head displacement mechanism 76 to move the wafer to a location where an acoustic transducer and receiver can act on the front of the wafer. This is, for example, off the platen or at predetermined location on the platen where the transducer and receiver are located. The thickness of the wafer and the oxide layer on the wafer is determined by the processor 74 which analyzes the acoustic wave that is sent by the transducer 302 and the acoustic wave that is received by the receiver 304. More particularly, thickness is determined from the round trip time interval between the launch of an acoustical wave by the transducer 302 and the reception of the reflected wave by the receiver 304, and the speed of the acoustic waves through the layers of the wafer.

The amplitude as well as round trip time of the acoustic waves will change after a film has been completely removed and a different film layer has been contacted. An end point that corresponds to the interfaces of a different fill of multiple layers of stacked films can be detected, as well as the end point of an oxide layer. In one embodiment, the planarization of a film is measured in real time by measuring a film thickness at several locations on the wafer.

The system controller 72 causes the transducer 302 to generate acoustical waves, and receives voltage signals from the receiver 304, the processor 74 communicates with the controller 72 to analyze the acoustical waves. More particularly, the controller 72 includes a pulse generator and amplifier driving the transducer 302, includes a low noise amplifier amplifying the signal produced by the receiver 30, and includes a lock in amplifier coordinating the signals generated by the pulse generator and received by the receiver 304.

In another alternative embodiment, shown in FIG. 9, the system 10 comprises an end point detector (or end point detection means) 400 comprising means for detecting temperatures of different areas of the wafer using an infrared camera during polishing to develop an infrared image of the wafer. Such infrared mapping is disclosed in U.S. Pat. No. 5,196,353, issued to Sandhu et al., assigned to the assignee of the present invention, and incorporated herein by reference.

More particularly, in the illustrated embodiment, the means for detecting temperatures of different areas of the wafer comprises an infrared camera 402 connected to the controller 72 (and thus to the processor 74) via line 404. The infrared camera 402 may be mounted to the platen 22. In the illustrated embodiment, the operative portion (lens or window) of the infrared camera 402 is generally flush with, or slightly below, the top surface of the polishing pad 24 and faces the wafer. During polishing, the wafer is periodically moved by the polishing head displacement mechanism 36 over the camera 402. The camera 402 is of a type which contains an array or matrix of cells and is capable of mapping temperatures at different locations, and hence at different locations of the wafer.

In an alternative embodiment, a camera 406 (shown with dashed lines) is provided instead of the camera 402, and is connected to the controller 72 (and thus to the processor 74) via line 408. The camera 406 includes a lens or operative portion extending radially outwardly from the center of the platen subassembly to the periphery of the platen subassembly. In this manner, the wafer is continuously scanned during polishing.

With either camera arrangement, infrared waves emitted from the wafer are detected, and this information is correlated by the camera to the heat of various locations on the wafer. The infrared camera can either continuously (e.g., video), or periodically (e.g., photograph) take an image of the wafer. During polishing of a wafer, process heat is developed as a result of friction. The temperature of the wafer surface is largely dependent on frictional force. Because different layers of the semiconductor material are formed of different materials (e.g., metallic films, polysilicon films, insulators) which have different relative hardnesses, the coefficient of friction and thus the temperature of the wafer will change in response to contact with a different layer. For example, integrated circuit devices on the wafer are generally harder than the oxide coating on the integrated circuit devices. In addition to use in developing a thermal image of the wafer developed during the polishing process, such temperature differentials are used to detect planar end points on the wafer. More particularly, the camera is connected to the controller 72, and the processor 74 determines when a planar end point has been reached in response to an expected temperature differential.

For example, the coefficient of friction between the wafer and the polishing pad 24, and thus the infrared image of the wafer, may be generally constant until the oxide of the wafer is polished away to a point where the surface of integrated circuits is exposed. At this time, the integrated circuits will contact the surface of the polishing pad. Because the integrated circuits are typically formed of harder material than the oxide coating, a different coefficient of friction occurs, and temperature rises. This rise in temperature is detected by the infrared camera and is used to control the operational parameters of the system 10. Such a rise in temperature may occur at a particular location on the wafer where oxide is more thoroughly removed than other areas. The pressure applicators can then be controlled to deform the wafer so that oxide is also removed from the rest of the wafer. Other operational parameters can also be adjusted based on the information provided by the infrared camera.

Figure 11:
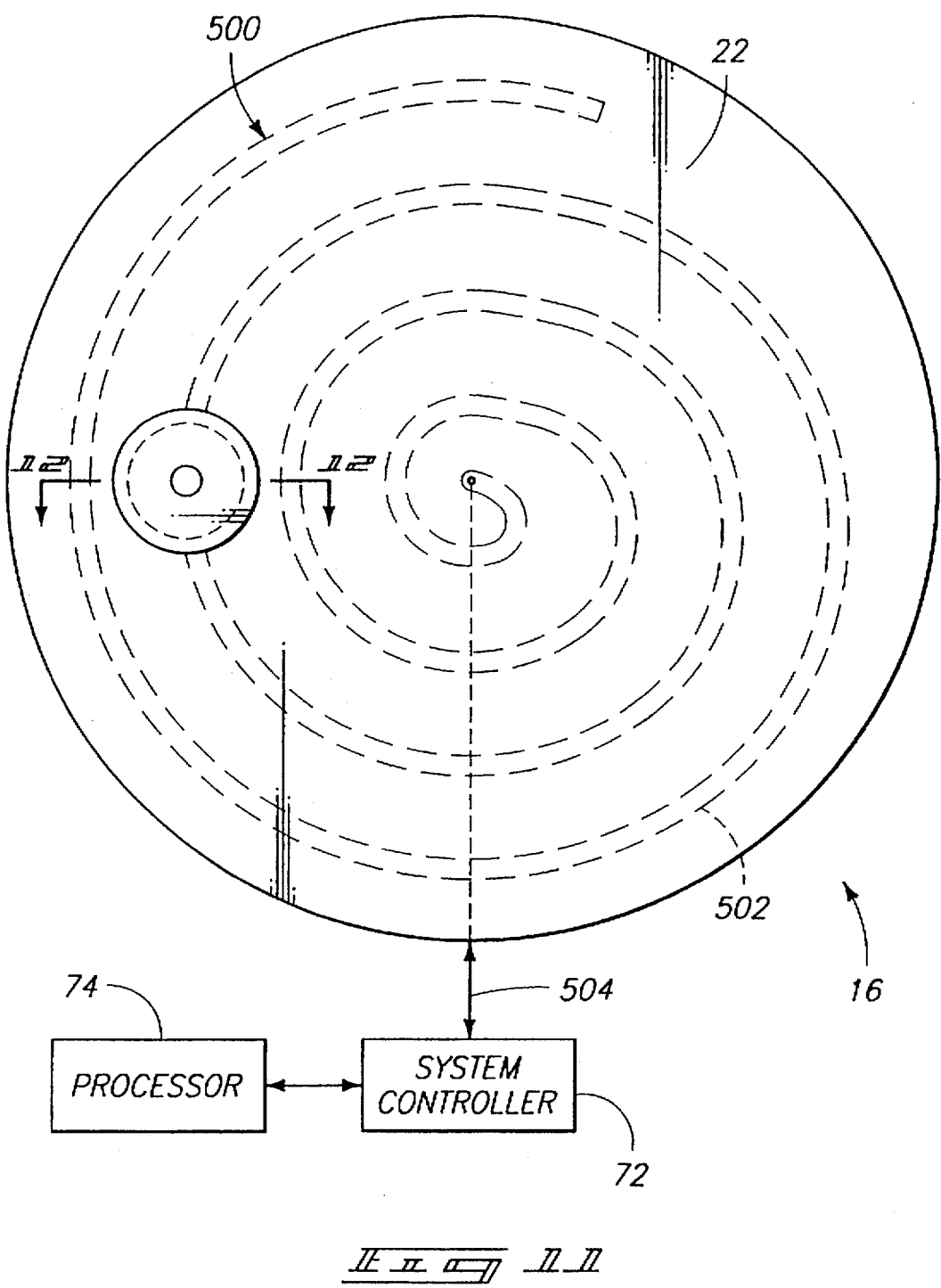
FIG. 11 is a diagrammatic top view of a polishing head and platen subassembly according to another aspect of this invention.

In another alternative embodiment, shown in FIG. 11, the system 10 further comprises means 500 for heating the wafer while the wafer face is being polished. More particularly, the heating means 500 is controllably adjustable while the wafer is being polished, so that wafer temperature becomes another of the adjustable operational parameters.

In the embodiment shown in FIG. 11, the heating means 500 comprises a heater or means for heating the platen subassembly 16 while the wafer is being polished. More particularly, the heating means 500 comprises a heating filament 502 supported by the platen subassembly 16 in the illustrated embodiment. In the illustrated embodiment, the heating filament 502 is an element that evenly heats the platen, and that is located in the platen just below the pad 24. Appropriate connectors permit electrical connection to the filament 502, for energization of the filament, while allowing rotation of the filament 502 with the platen. For example, circumferential connectors can be provided on the shaft that rotates the platen 22, and electrical contact can be made using brushes. The heating filament 502 is connected to the system controller 72 (and therefore to the processor 74) via a connector 504. In alternative embodiments, controllably heated liquid (described below in greater detail) or gas is introduced to the interior or exterior of the platen to controllably heat the platen.

Figure 12:
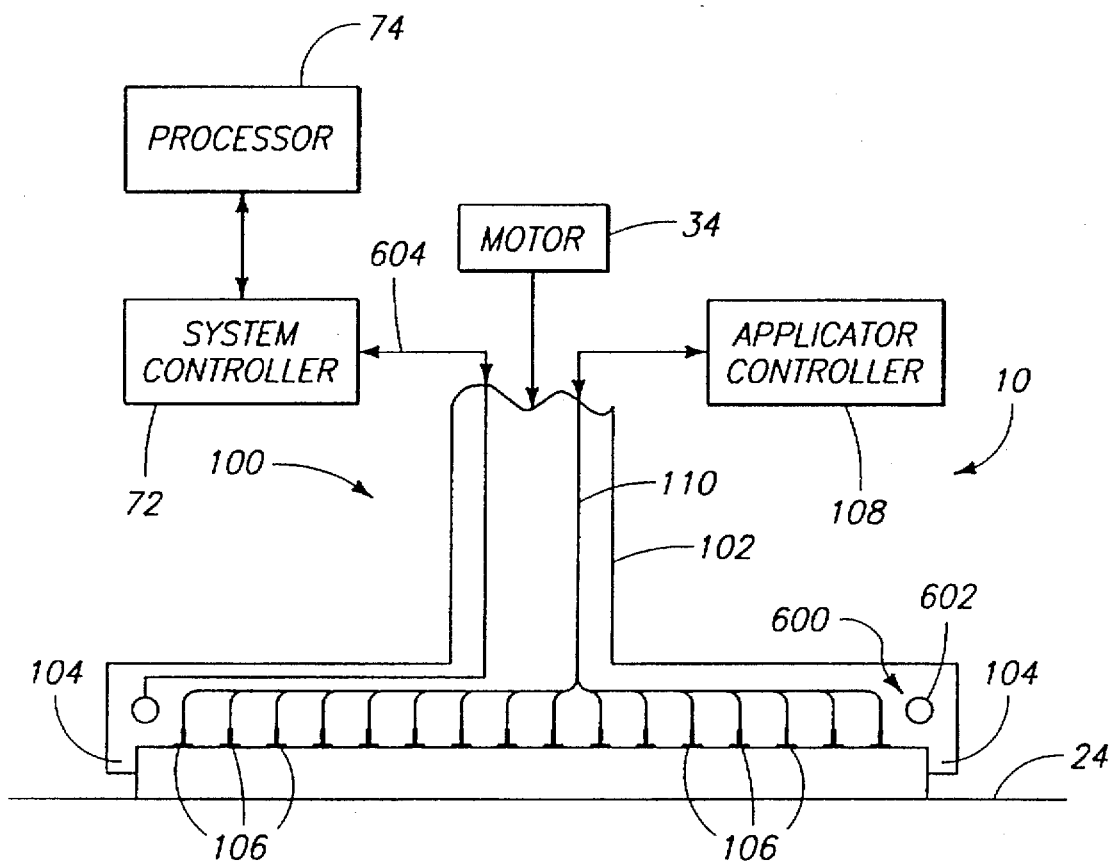
FIG. 12 is a diagrammatic sectional view of a polishing head taken along line 12—12 of FIG. 11.

In another alternative embodiment, shown in FIG. 12, the system 10 further comprises a heater or means 600 for heating the wafer while the wafer face is being polished, in the form of means for heating the polishing head 32 while the wafer is being polished. More particularly, the heating means 600 comprises a heating filament 602 supported by the polishing head 100 in the illustrated embodiment. In the illustrated embodiment, the heating filament 602 is annular or arcuate. However, other alternative heating filament shapes can be employed. Appropriate connectors permit electrical connection to the filament 602, for energization of the filament, while allowing rotation of the filament 602 with the polishing head 100. For example, circumferential connectors can be provided on the shaft that rotates the polishing head 100, and electrical contact can be made using brushes. In alternative embodiments, controllably heated fluid (liquid or gas) is introduced to the interior or exterior of the polishing head to heat the polishing head. The heating filament 602 is connected to the system controller 72 (and therefore to the processor 74) via a connector 604.

Figure 13:
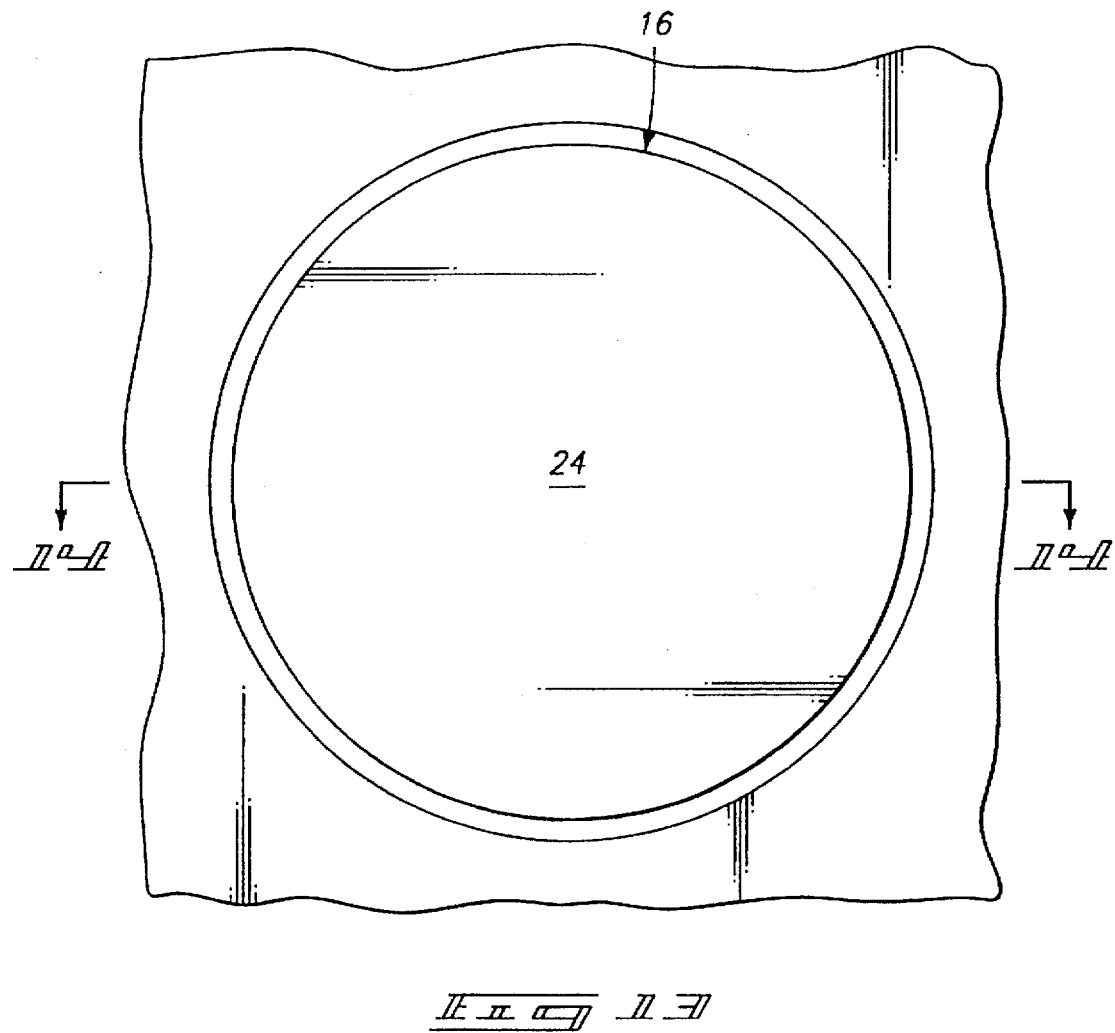
FIG. 13 is a top view showing a platen subassembly included in a polishing system according to another aspect of this invention.
Figure 14:
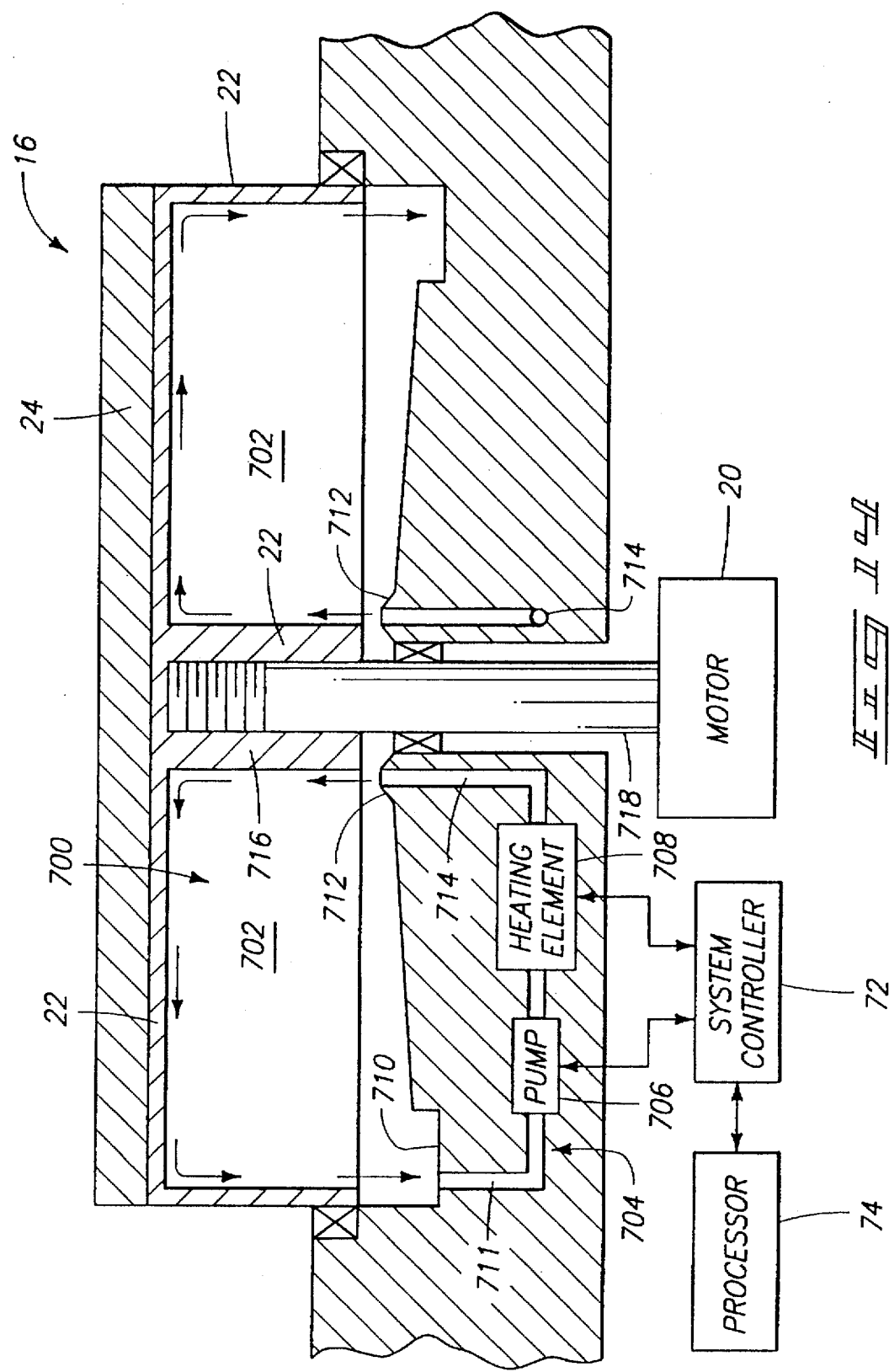
FIG. 14 is a diagrammatic sectional view of the platen subassembly taken along line 14—14 of FIG. 13.

In another alternative embodiment, shown in FIGS. 13–14, the system 10 further comprises a heater or means 700 for heating the wafer while the wafer face is being polished, in the form of a heater or means 704 for heating the platen subassembly 16 while the wafer is being polished.

More particularly, platen subassembly 16 comprises a platen 22 having a hollow interior 702 (or a fluid passage in its interior), and the means for heating the platen subassembly 16 comprises means for flowing fluid through the hollow interior 702 and for controllably heating the temperature of the fluid. In the illustrated embodiment, the fluid is a liquid; however, in alternative embodiments, the fluid is a gas. In the embodiment shown in FIG. 14, the means for flowing fluid and for controllably heating the temperature of the fluid comprises the hollow interior or fluid passage 702, a pump 706 in fluid communication with the hollow interior or fluid passage 702 and conducting fluid through the hollow interior, and a heating element 708 heating the fluid. The pump 706 and the heating element 708 are connected to the controller 72, and thus to the processor 74.

In the illustrated embodiment, the fluid is a liquid, and the system 10 further includes, as appropriate, a sump or collection area 710 which may be generally annular, a conduit 711 directing collected liquid to the pump 706, nozzles 712 directed at the hollow interior or fluid passage 702; and conduits 714 from the pump 706 to the nozzles 712. Bearings may be provided where appropriate. The heating element 708 can heat fluid either before or after it passes through the pump 706. In an embodiment where the fluid is a gas, the heating element 708, nozzles 712, sump 710, and conduit 711 can be replaced with a blower unit which selectively forces heated air at a controllable rate and/or controllable temperature toward the hollow interior or fluid passage 702.

The platen subassembly 16 includes any appropriate mounting structure 716 with which the platen subassembly 16 is supported for rotation with a spindle 718 driven by the motor 20. For example, the platen subassembly 16 can be threaded, friction fit, welded, or otherwise secured to the spindle 718 or other support structure.

In alternative embodiments (not shown), the platen subassembly 16 is supported such that the hollow interior 702 is in direct contact with a pool of liquid, which pool of liquid is selectively heated or cooled.

Figure 15:
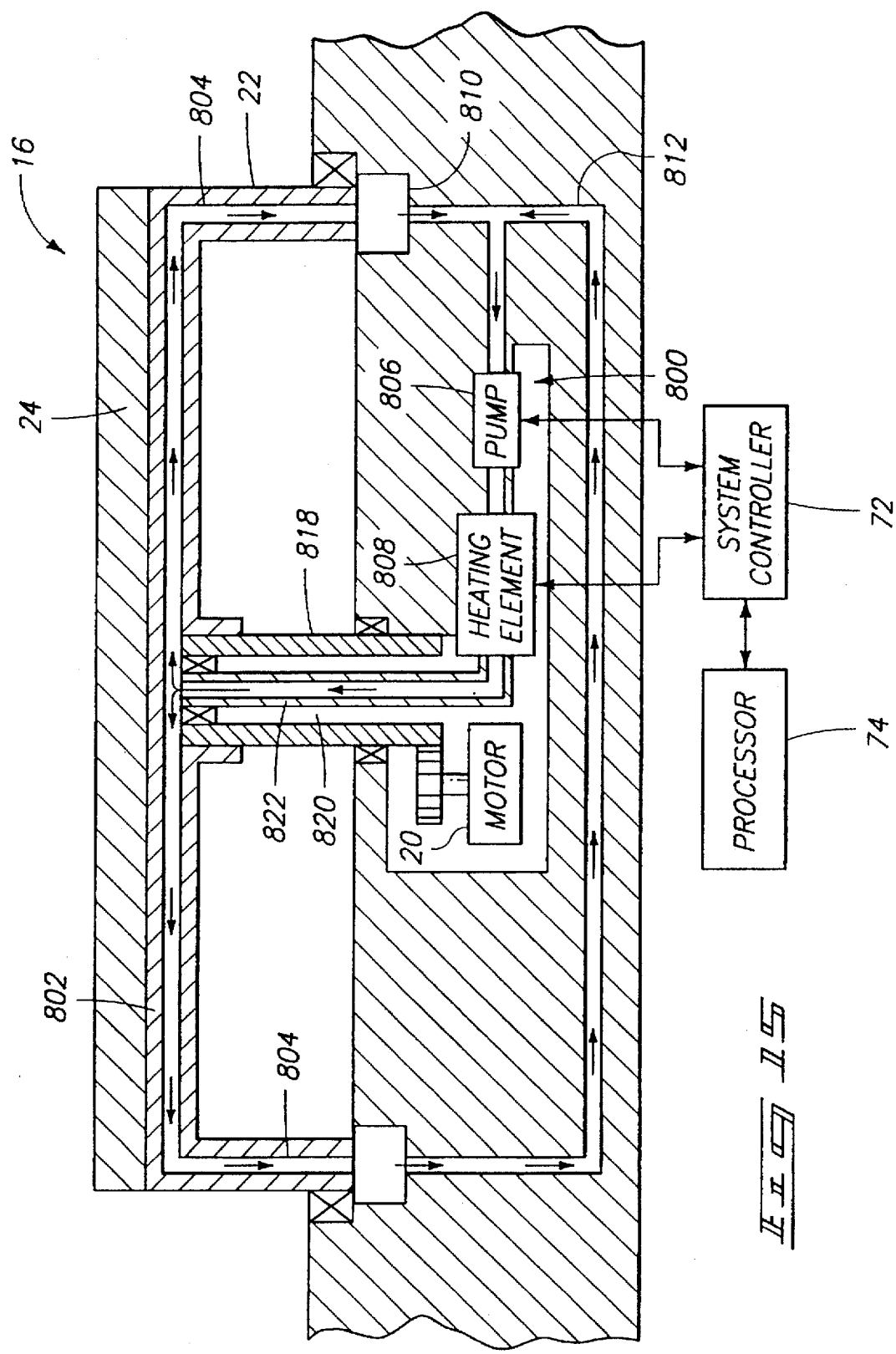
FIG. 15 is a diagrammatic sectional view of a platen subassembly according to another aspect of this invention.

In another alternative embodiment, shown in FIG. 15, the system 10 comprises a heater or means 800 for heating the wafer while the wafer face is being polished, in the form of a heater or means 802 for heating the platen subassembly 16 while the wafer is being polished. In the embodiment shown in FIG. 15, the platen subassembly 16 comprises a platen 22 having a fluid passage 804 in its interior, and the means for heating the platen subassembly 16 comprises means for flowing fluid through the fluid passage 804 and for controllably heating the temperature of the fluid. In the illustrated embodiment, the platen subassembly 16 is supported for rotation by a rotatable spindle 818 having a hollow interior 820, and fluid is introduced into the fluid passage 804 via the hollow interior 820 of the spindle 818. Optionally, a tube 822 is provided in the hollow interior 820, and the spindle 818 rotates about the tube 822. In the illustrated embodiment, the fluid is a liquid; however, in alternative embodiments, the fluid is a gas. In the embodiment shown in FIG. 15, the means for flowing fluid and for controllably heating the temperature of the fluid comprises the fluid passage 804, the tube 822 or hollow 820 in fluid communication with the fluid passage 804, a pump 806 in fluid communication with the fluid passage 804 or hollow 820, and a heating element 808 heating the fluid. The pump 806 and the heating element 808 are connected to the controller 72, and thus to the processor 74.

In the illustrated embodiment, the fluid is a liquid, and the system 10 further includes, as appropriate, a sump or collection area 810, a conduit 812 directing collected liquid to the pump 806, and bearings, as appropriate. The heating element 820 can heat fluid either before or after it passes through the pump 806. In an embodiment where the fluid is a gas, the heating element 808, sump 810, and conduits 812 can be replaced with a blower unit in fluid communication with the hollow 820 or tube 822.

Figure 16:
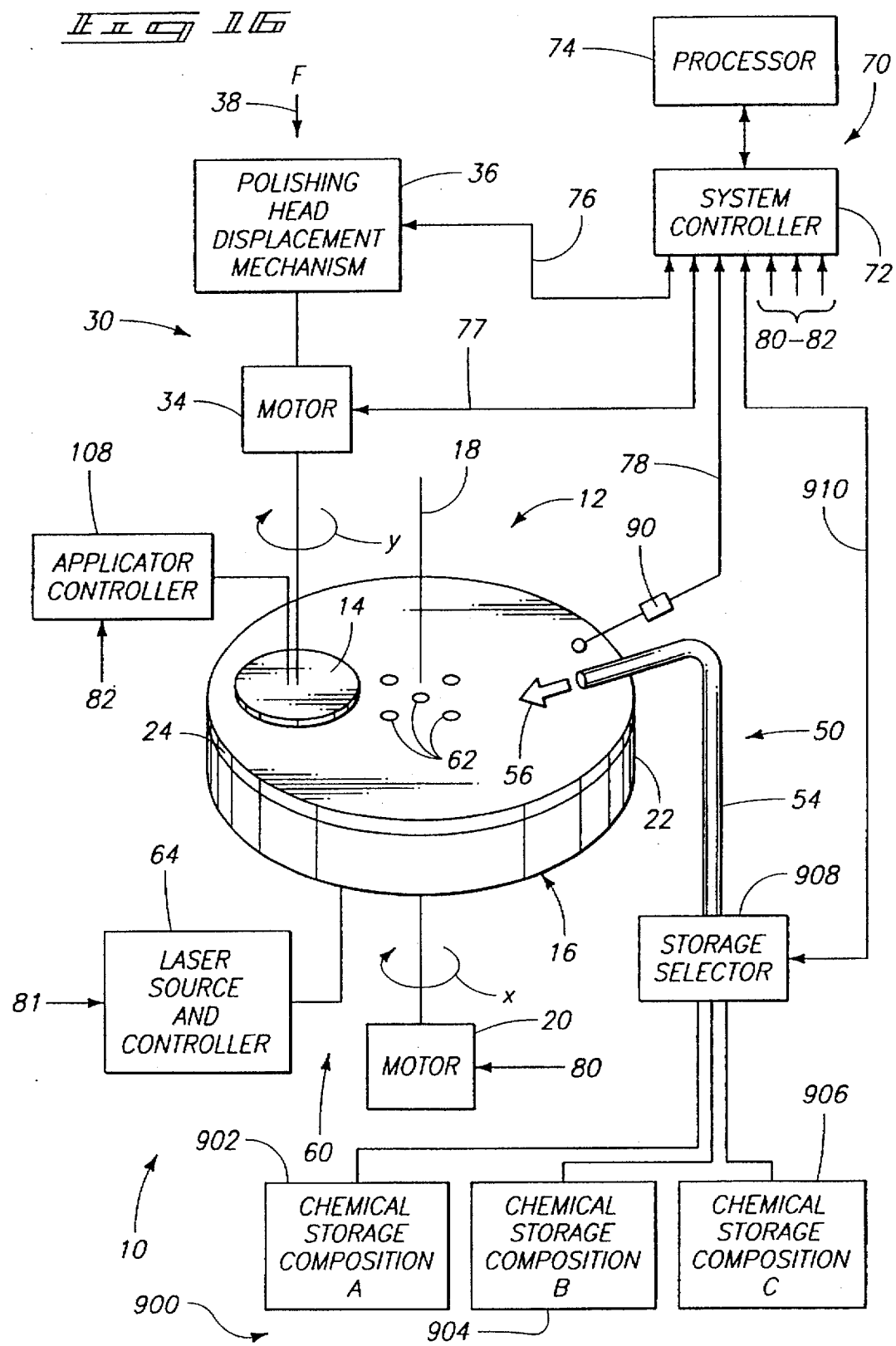
FIG. 16 is a diagrammatic perspective view of a polishing system according to another aspect of the invention.

In another alternative embodiment, shown in FIG. 16, the system 10 comprises a heater or means 900 for heating the wafer while the wafer face is being polished, in the form of means for changing the composition of the slurry delivered by the slurry supply system 50. More particularly, in the embodiment shown in FIG. 16, the slurry supply system 50 comprises multiple chemical storage areas 902, 904, 906, etc., which contain slurries of different compositions, and a controllable storage selector 908 which supplies a slurry of a selected composition to the conduit 54. The storage selector 908 is connected to the system controller 72, and thus to the processor 74, via a line 910. Because the different slurries contained in the chemical storage areas 902, 904, 906, etc. have different compositions, changing the chemical slurry results in a change in friction between the wafer and the polishing pad, and therefore in a change in temperature of the wafer while the wafer is being polished.

Figure 17:
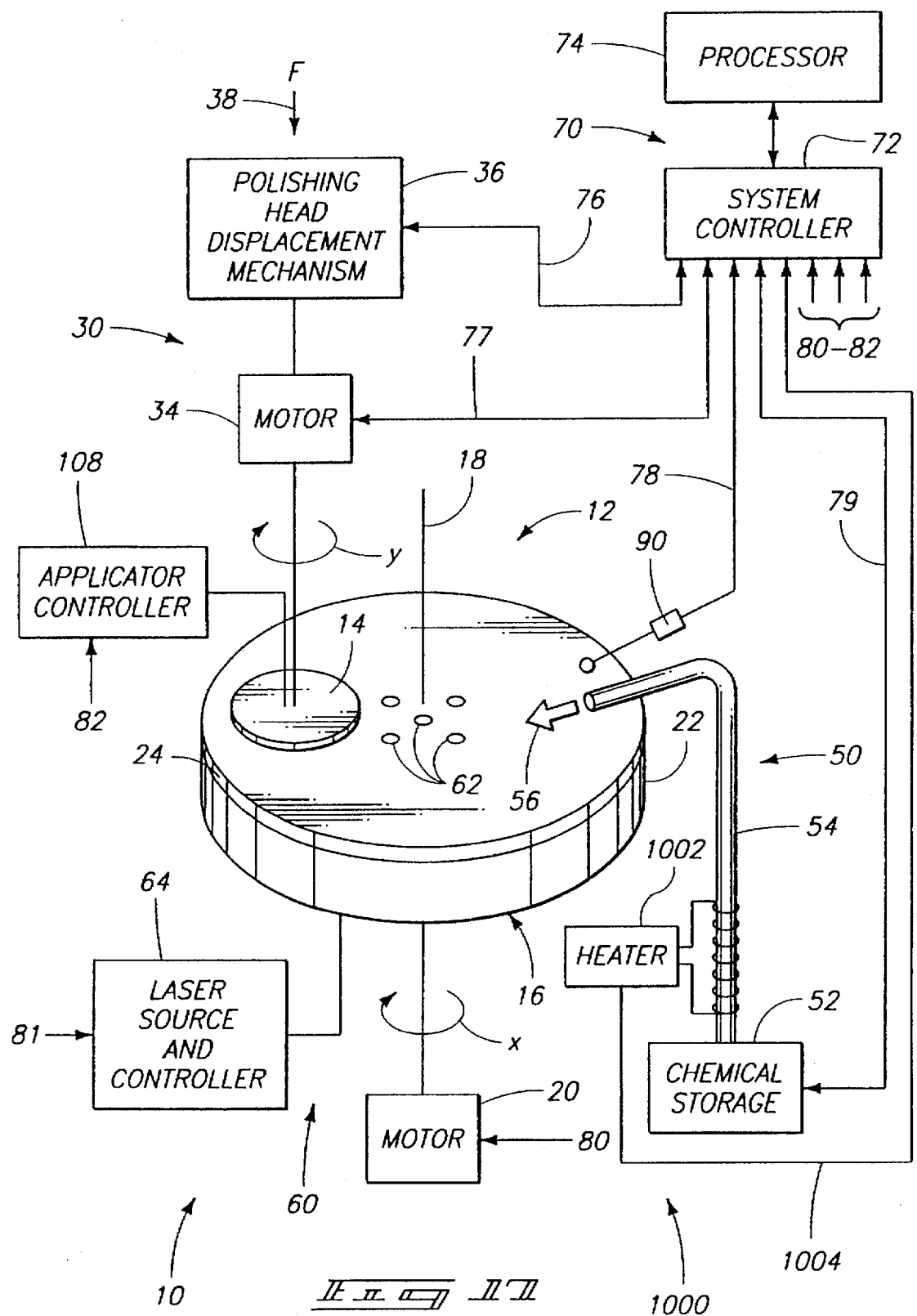
FIG. 17 is a diagrammatic perspective view of a polishing system according to another aspect of the invention.

In another alternative embodiment, shown in FIG. 17, the system 10 comprises a heater or means 1000 for heating the wafer while the wafer face is being polished, in the form of means for heating the slurry before it is supplied to the wafer. More particularly, in the embodiment shown in FIG. 17, the system 10 comprises a heater 1002 which heats the slurry from the chemical storage 52 before it is supplied to the wafer, to heat the wafer. The heater 1002 is connected to the system controller 72, and thus to the processor 74, via a line 1004.

In yet another alternative embodiment (FIG. 1), the system 10 comprises heating means for controllably heating the wafer as it is being polished in the form of means for adjusting the force between the polishing head and the platen subassembly. More particularly, if the processor 74 determines that the temperature of the wafer should be changed, it instructs the system controller 72 to act on the polishing head displacement mechanism 36 to adjust the force between the wafer and the polishing pad 24. The change in force results in a change of friction between the wafer and the polishing pad, which in turn results in a change in temperature of the wafer while the wafer is being polished.

Figure 18:
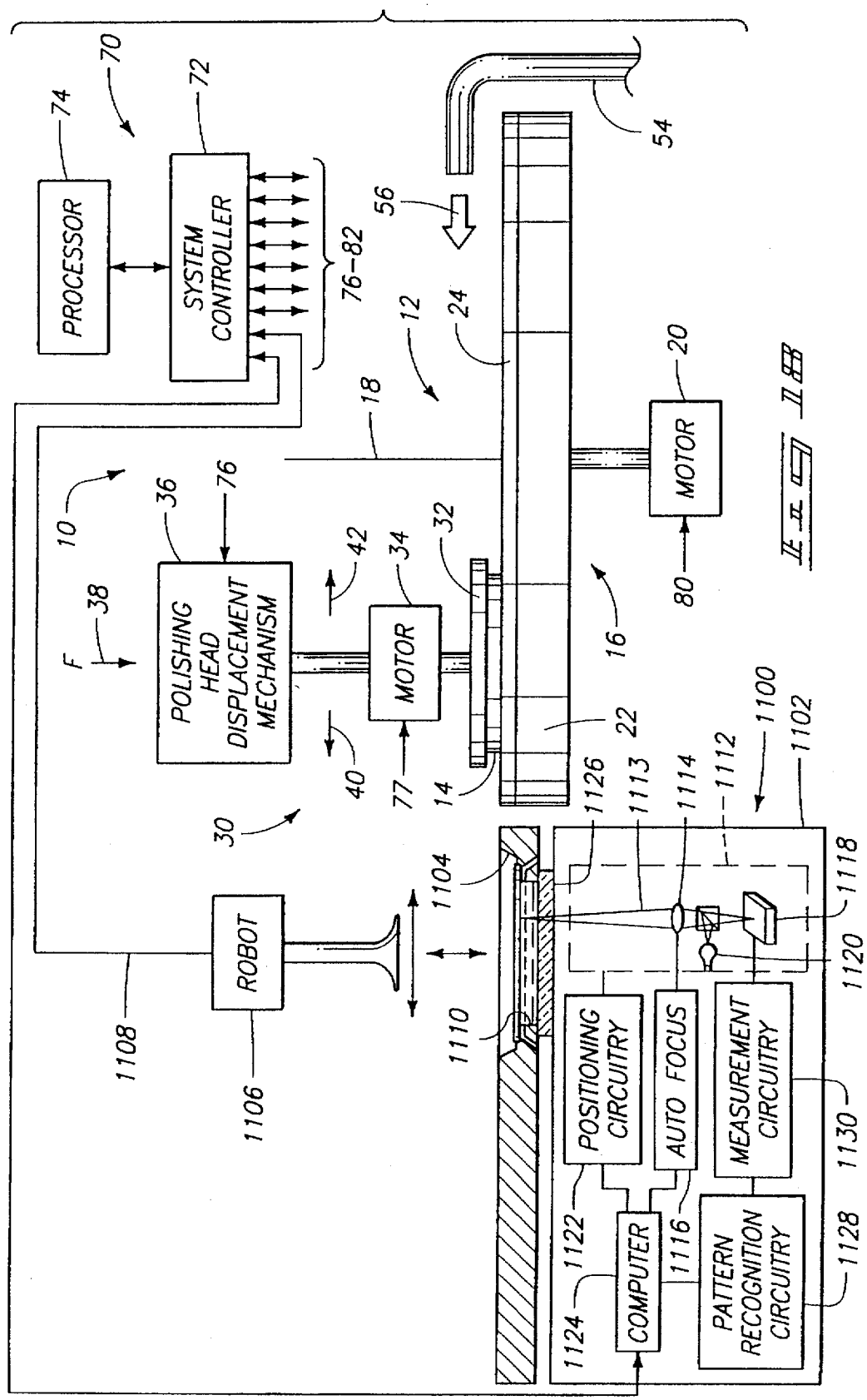
FIG. 18 is a diagrammatic side view of a polishing system including an alternative end point detector.

In one embodiment, shown in FIG. 18, the system 10 further comprises an end point detector (or end point detection means) 1100 operating on the wafer and communicating with the system controller 72, and thus with the processor 74, for determining if polishing of the wafer is complete. In the embodiment shown in FIG. 18, the end point detector comprises an optical measurement system 1102 including a liquid filled, wafer receiving area 1104 which selectively receives the wafer. Such an optical measurement system 1102 is sold by Nova Inc., under the product name NovaScan 210-CMP Monitoring System.

The system 10 shown in FIG. 18 further includes a robot 1106, which is connected to the system controller 72, and thus to the processor 74, via line 1108. The robot 1106 periodically moves the wafer from the platen to the wafer receiving area 1104 to determine whether polishing is complete, or to otherwise evaluate the wafer. Robots for moving wafers are commonly known in the wafer polishing art, and the robot 1106 will not be discussed herein in great detail. The robot 1106 is capable of lifting, translating, and depositing a wafer, and can be of a type that uses suction to engage the rear surface of a wafer, or of a type that engages an edge of the wafer.

The optical measurement system 1102 measures film thickness at multiple different locations on the wafer face while the wafer face is in contact with a liquid 1110 in the wafer receiving area 1104, which can be water, a slurry of the type provided by the slurry delivery system 50, or another appropriate liquid for keeping the wafer face wet. Thus, drying of the wafer is avoided while the film thickness measurements are taken. If the wafer requires further polishing, it can be returned to the platen by the robot 1106 while still wet. If no provision was made to keep the wafer wet, the slurry would dry on the wafer face making further polishing difficult or impossible.

It is not practical to move a wet wafer and still take optical measurements. Thus, in the illustrated embodiment, the optical measurement system 1102 comprises movable optics 1112 which scan the wafer face while the wafer face remains stationary. More particularly, the optical measurement system 1102 includes positioning circuitry 1122, under the control of optical measurement system computer 1124, which moves the optics 1112 along x and y axes which are parallel to the face of the wafer (e.g., in the illustrated embodiment, the optics 1112 moves along horizontal axes). The optics 1112 include a lens 1114, and an auto focus system 1116 which focuses the lens 1114. A photosensor array 1118 receives information from the wafer via the lens 1114, and a light source 1120 provides illumination.

The optical measurement system 1102 comprises an optical window 1126, such as a transparent (e.g., glass) window, at the bottom of the wafer receiving area 1104. Thus, the wafer receiving area 1104 is located on one side of the window, and the optics are located on the other side of the window 1126.

The optical measurement system 1102 includes a pattern recognition system (circuitry) 1128 receiving information from the photosensor array 1118 via measurement circuitry 1130. The measurement circuitry 1130 charges and discharges cells in the photosensor array 1118, and takes measurements in a known manner. The pattern recognition circuitry 1128 compares the thickness of a film on the wafer at various locations of the wafer with desired thicknesses (process specifications) that are preprogrammed into the processor 74. Such pattern recognition circuitry is known in the art, and included in the NovaScan 210 CMP Monitoring System. Other companies that manufacture appropriate pattern recognition circuitry include Tencor, Metrologix, and Thermawave. If polishing is complete, the robot 1106 transports the wafer to an area which contains completed wafers, such as an unload cassette. If the wafer is underpolished, the robot 1106 transports the wafer back to the platen for additional polishing. If the wafer is either overpolished or underpolished, the system 10 modifies the sequence and duration of operational parameters (e.g., the polishing recipe) for the next wafer that is to be polished so as to improve the polishing results. When the next wafer is polished and measured by the optical measurement system 1102, it should be closer to being appropriately (completely) polished.

The optical measurement system 1102 takes measurements at multiple points on a wafer at a very fast rate, so that the throughput of the system 10 is not adversely affected.

As the semiconductor wafer is rotated and pressed against the platen subassembly 16, the oxide surface of the wafer contacts the polishing pad 24 of the platen 22. The oxide surface of the wafer has a thickness that changes as the wafer is polished. The oxide thickness changes as the oxide is polished away. Similarly, thicknesses measurements can be taken, using the optical measurement system 1102, for different films formed on the wafer. Such different thicknesses can be detected by the optical measurement system 1102 to terminate polishing when an end point has been reached. The desired end point is preprogrammed into the processor 74, and can be after the oxide surface is removed, or after a certain film formed on the substrate is removed.

In the embodiment shown in FIG. 18, the optical window is spaced apart from the platen, and the robot selectively moves the wafer between the platen and the wafer receiving area. In an alternative embodiment, shown in FIG. 19, the optical window is located on the platen, the platen includes a polishing surface 1200 spaced apart from the optical window 1126, and the polishing head selectively moves the wafer between the polishing surface 1200 and the optical window 1126.

Figure 19:
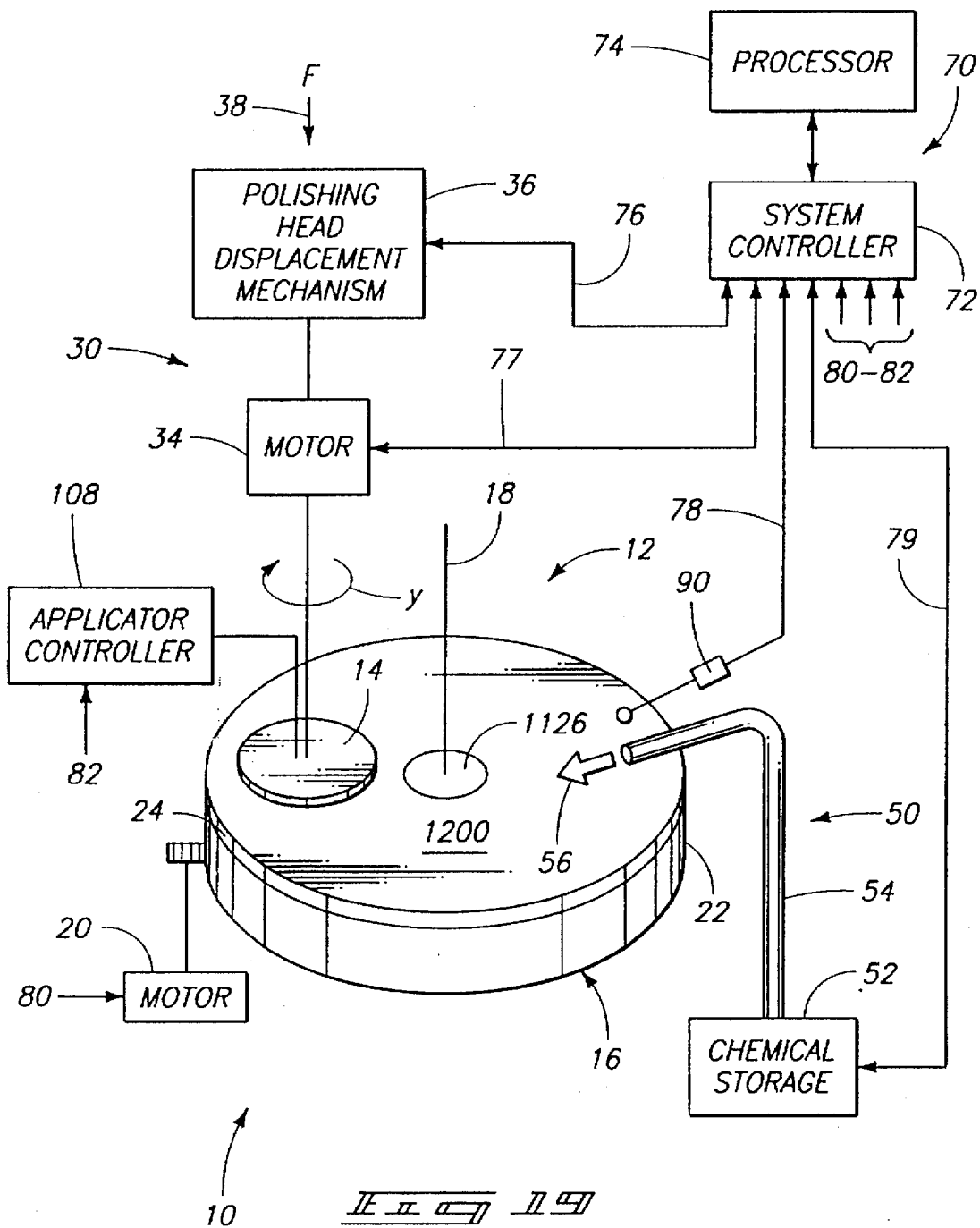
FIG. 19 is a diagrammatic perspective view of a polishing system according to another aspect of the invention.

More particularly, in the embodiment shown in FIG. 19, the optical window 1126 is located at the center of the platen.

Various combinations of the components of the alternative embodiments is also contemplated, and is within the scope of the invention.

System 10 is therefore a fully automatic, computer driven apparatus that can polish a wafer, monitor results in situ, and make appropriate modifications in a real-time manner without any human intervention. The invention is advantageous over prior art polishing apparatus because it largely reduces the number of pre- and post-polishing measurements and significantly enhances throughput. The system enhances both efficiency and quality.

In compliance with the statute, the invention has been described in language necessarily limited in its ability to properly convey the conceptual nature of the invention. Because of this inherent limitation of language, it must be understood that the invention is not necessarily limited to the specific features shown and described, since the means and methods herein disclosed comprise merely preferred forms of putting the invention into effect. The invention is, therefore, claimed in any of its forms or modifications within the proper scope of the appended claims appropriately interpreted in accordance with the doctrine of equivalents.

We claim:

1. A system for polishing a semiconductor wafer, the system comprising:

a wafer polishing assembly for polishing a face of a semiconductor wafer at a polishing rate and a polishing uniformity, the wafer polishing assembly including a platen subassembly defining a polishing area, a slurry supply system configured to deliver a slurry to the polishing area, and a polishing head selectively supporting a semiconductor wafer and configured to hold a face of the semiconductor wafer in contact with the platen subassembly;

an optical measurement system including a liquid filled, wafer receiving area which selectively receives the wafer, the wafer receiving area being spaced apart from the platen in a direction perpendicular to the axis of rotation of the platen, the optical measurement system measuring film thickness at multiple different locations on the wafer face; and a robot selectively moving the wafer between the platen and the wafer receiving area.

2. A system in accordance with claim 1 wherein the optical measurement system comprises movable optics which scan the wafer face while the wafer face remains stationary.

3. A system in accordance with claim 1 wherein the optical measurement system includes pattern recognition system.

4. A system in accordance with claim 2 wherein the optical measurement system comprises an optical window, wherein the wafer receiving area is located on one side of the window, and wherein the optics are located on the other side of the window.

5. A system in accordance with claim 3 and further comprising end point detection means for determining if polishing of the wafer is complete, the end point detection means comprising means for causing the pattern recognition system to compare the thickness of a film on the wafer at various locations of the wafer with desired thicknesses.

6. A system in accordance with claim 1 wherein the polishing head supports the semiconductor wafer and holds the face of the semiconductor wafer in contact with the platen subassembly under an adjustable polishing force to polish the wafer face, and further comprising a controller selectively adjusting the polishing force during polishing of the wafer.

7. A system in accordance with claim 1 wherein the platen subassembly is rotatable about an axis and rotates at a variable platen velocity, and further comprising a controller selectively adjusting the velocity of the platen during polishing of the wafer.

8. A system in accordance with claim 1 wherein the polishing head is rotatable about an axis and rotates at a variable wafer velocity, and further comprising a controller selectively adjusting the velocity of the polishing head during polishing of the wafer.

9. A system in accordance with claim 1 wherein the polishing head is movable across the platen subassembly along an adjustable polishing path, and further comprising a controller selectively adjusting the path of the polishing head during polishing of the wafer.

10. A system in accordance with claim 1 wherein the polishing head is movable across the platen subassembly at an adjustable wafer movement rate, and further comprising a controller selectively adjusting the rate of movement of the polishing head across the platen subassembly, during polishing of the wafer.

11. A system for polishing a semiconductor wafer comprising:

a wafer polishing assembly for polishing a face of a semiconductor wafer at a polishing rate and a polishing uniformity, the wafer polishing assembly including a platen, a polishing head which supports the semiconductor wafer, and a polishing head displacement mechanism which moves the polishing head and wafer across the platen along an adjustable polishing path, the wafer polishing assembly having a plurality of controllable operational parameters that upon variation change the polishing rate and polishing uniformity;

a controller operably coupled to the wafer polishing assembly for monitoring and managing in situ at least one of the operational parameters of the wafer polishing assembly;

a processor operably coupled to the controller for determining a set of desired operational parameters based on the monitored operational parameters and outputting control information indicative of the desired operational parameters to the controller, the controller adjusting in situ at least one of the operational parameters of the wafer polishing assembly, including the polishing path, in response to the control information from the processor to effectuate a new polishing rate and a new polishing uniformity as the wafer polishing assembly continues to polish the face of the semiconductor wafer; and an optical measurement system selectively measuring film thickness at multiple different locations on the wafer face, the optical measurement system including a liquid filled wafer receiving area keeping the wafer face wet while the film thickness measurements are taken.

12. A system in accordance with claim 11 wherein the optical measurement system comprises movable optics which scan the wafer face while the wafer face remains stationary.

13. A system in accordance with claim 11 wherein the optical measurement system includes a pattern recognition system.

14. A system in accordance with claim 12 wherein the optical measurement system comprises an optical window, wherein the wafer receiving area is located on one side of the window, and wherein the optics are located on the other side of the window.

15. A system in accordance with claim 14 wherein the optical window is spaced apart from the platen, and further comprising a robot selectively moving the wafer between the platen and the wafer receiving area.

16. A system in accordance with claim 13 and further comprising an end point detector which determines if polishing of the wafer is complete, the end point detector comprising means for causing the pattern recognition system to compare the thickness of a film on the wafer at various locations of the wafer with desired thicknesses.

17. A system in accordance with claim 11 wherein the polishing head supports the semiconductor wafer and holds the face of the semiconductor wafer in contact with the platen subassembly under an adjustable polishing force to polish the wafer face, and wherein the controller selectively adjusts the polishing force during polishing of the wafer.

18. A system in accordance with claim 11 wherein the platen subassembly is rotatable about an axis and rotates at a variable platen velocity, and wherein the controller selectively adjusts the velocity of the platen during polishing of the wafer.

19. A system in accordance with claim 11 wherein the polishing head is rotatable about an axis and rotates at a variable wafer velocity, and wherein the controller selectively adjusts the velocity of the polishing head during polishing of the wafer.

20. A system in accordance with claim 11 wherein the polishing head is movable across the platen subassembly along an adjustable polishing path, and wherein the controller selectively adjusts the path of the polishing head during polishing of the wafer.

21. A system in accordance with claim 11 wherein the polishing head is movable across the platen subassembly at an adjustable wafer movement rate, and wherein the controller selectively adjusts the rate of movement of the polishing head during polishing of the wafer.

22. A system for polishing a semiconductor wafer comprising:

a wafer polishing assembly for polishing a face of a semiconductor wafer at a polishing rate and a polishing uniformity, the wafer polishing assembly including a platen, a polishing head which supports the semiconductor wafer, and a polishing head displacement mechanism which moves the polishing head and wafer across the platen, the wafer polishing assembly having a plurality of controllable operational parameters that upon variation change the polishing rate and polishing uniformity;

a controller operably coupled to the wafer polishing assembly for monitoring and managing in situ at least one of the operational parameters of the wafer polishing assembly;

a processor operably coupled to the controller for determining a set of desired operational parameters based on the monitored operational parameters and outputting control information indicative of the desired operational parameters to the controller, the controller adjusting in situ at least one of the operational parameters of the wafer polishing assembly in response to the control information from the processor to effectuate a new polishing rate and a new polishing uniformity as the wafer polishing assembly continues to polish the face of the semiconductor wafer;

a detector operating on the wafer and communicating with the processor to determine whether polishing of the wafer is complete, the detector including an optical measurement system measuring film thickness at multiple different locations on the wafer face while the wafer is under a liquid, the optical measurement system including an optical window spaced apart from the platen, a liquid containing wafer receiving area above the window movable optics below the window which scan the wafer face while the wafer face remains stationary, and a pattern recognition system; and a robot selectively moving the wafer between the platen and the wafer receiving area above the window.

23. A system for polishing a semiconductor wafer, the system comprising:

a wafer polishing assembly for polishing a face of a semiconductor wafer, the wafer polishing assembly including a platen, and a polishing head selectively supporting a semiconductor wafer and configured to hold a face of the semiconductor wafer in contact with the platen;

a detector operating on the wafer to determine whether polishing of the wafer is complete, the detector including an optical measurement system including a wafer receiving area which selectively receives the wafer, the wafer receiving area being spaced apart from the platen in a direction perpendicular to the axis of rotation of the platen, the optical measurement system measuring film thickness at multiple different locations on the wafer face; and a robot selectively moving the wafer between the platen and the wafer receiving area.

24. A system for polishing a semiconductor wafer, the system comprising:

a wafer polishing assembly for polishing a face of a semiconductor wafer, the wafer polishing assembly including a platen, and a wafer receiving polishing head facing the platen and configured to support a semiconductor wafer and hold a face of the semiconductor wafer in contact with the platen;

a detector operating on the wafer to determine whether polishing of the wafer is complete, the detector including an optical measurement system which selectively receives the wafer, the wafer receiving area being spaced apart from the platen in a direction perpendicular to the axis of rotation of the platen, the optical measurement system measuring film thickness at multiple different locations on the wafer face; and a robot configured to periodically move the wafer between the platen and the wafer receiving area.

* * * * *

UNITED STATES PATENT AND TRADEMARK OFFICE
CERTIFICATE OF CORRECTION

PATENT NO.   : 5,730,642

DATED        : March 24, 1998

INVENTOR(S)  : Gurtej Sandhu; Trung Doan

It is certified that error appears in the above-identified patent and that said Letters Patent is hereby corrected as shown below:

Column 1, line 66, replace "fill" with --film--.

Column 10, line 66, replace "fill" with --film--.

Signed and Sealed this

Fourth Day of August, 1998

Attest:

BRUCE LEHMAN

*Attesting Officer*          *Commissioner of Patents and Trademarks*